(12) United States Patent
Howard et al.

(10) Patent No.: US 12,515,135 B2
(45) Date of Patent: Jan. 6, 2026

(54) GAME DEVELOPMENT VIA GENERATIVE AI

(71) Applicant: ChatbotTBD, LLC, Austin, TX (US)

(72) Inventors: Brian G. Howard, Austin, TX (US); John W. Howard, Cedar Park, TX (US); Bruce E. Stuckman, Austin, TX (US)

(73) Assignee: ChatbotTBD, LLC, Austin, TX (US)

( * ) Notice: Subject to any disclaimer, the term of this patent is extended or adjusted under 35 U.S.C. 154(b) by 232 days.

(21) Appl. No.: 18/430,953

(22) Filed: Feb. 2, 2024

(65) Prior Publication Data
US 2024/0325924 A1 Oct. 3, 2024

Related U.S. Application Data

(60) Provisional application No. 63/494,685, filed on Apr. 6, 2023, provisional application No. 63/492,412, filed on Mar. 27, 2023.

(51) Int. Cl.
*A63F 13/67* (2014.01)
*G06T 11/00* (2006.01)

(52) U.S. Cl.
CPC ............. *A63F 13/67* (2014.09); *G06T 11/00* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 11,904,247 B2* | 2/2024 | Suzuki | ................ | H04L 65/403 |
| 2018/0296929 A1* | 10/2018 | Vaccari | ................ | H04L 51/02 |
| 2020/0184612 A1* | 6/2020 | Marais | ................ | G06T 5/94 |
| 2021/0308570 A1* | 10/2021 | Kim | ................ | A63F 13/355 |
| 2021/0390749 A1* | 12/2021 | Stomakhin | ............. | G06T 13/40 |
| 2023/0211235 A1* | 7/2023 | Xu | ................ | A63F 13/213 463/31 |
| 2023/0316541 A1* | 10/2023 | Huang | ................ | G06V 10/764 382/103 |
| 2023/0338862 A1* | 10/2023 | Kim | ................ | A63F 13/35 |
| 2024/0307791 A1* | 9/2024 | Gazit | ................ | A63F 13/67 |

* cited by examiner

*Primary Examiner* — Toan H Vu
(74) *Attorney, Agent, or Firm* — Katz Ruby & Carle LLP; Bruce E. Stuckman

(57) ABSTRACT

A game development platform operates by: receiving, via a user interface, first natural language text that includes a character description to be associated with a character of a game under development; generating, based on the first natural language text and via a generative AI model trained on a library of images and natural language descriptions, image data corresponding to the character of the game under development; receiving, via the user interface, second natural language text that includes an updated character description to be associated with the character of the game under development; generating, via the generative AI model and based on the second natural language text, updated image data corresponding to the character of the game under development; receiving, via the user interface, an indication that the updated image data is accepted; and generating the game under development to include the updated image data corresponding to the character.

20 Claims, 32 Drawing Sheets

GAME DEVELOPMENT VIA GENERATIVE AI

CROSS-REFERENCE TO RELATED APPLICATIONS

The present U.S. Utility Patent Application claims priority pursuant to 35 U.S.C. § 119(e) to U.S. Provisional Application No. 63/492,412, entitled "GENERATIVE AI FOR USE WITH ELECTRONIC GAMES", filed Mar. 27, 2023; and U.S. Provisional Application No. 63/494,685, entitled "GAME CUTSCENE DEVELOPMENT VIA GENERATIVE AI", filed Apr. 6, 2023, both of which are hereby incorporated herein by reference in their entirety and made part of the present U.S. Utility Patent Application for all purposes.

TECHNICAL FIELD

The present disclosure relates to processing systems, platforms and applications used in the development and support of electronic games.

DETAILED DESCRIPTION

With the proliferation of game consoles, smart phones, tablets and other personal computing devices, the electronic gaming industry (including mobile gaming and online gaming), continues to grow worldwide. Game developers employ game development platforms to develop games to meet the appetite of worldwide players for new and more sophisticated content.

Figure 1A:
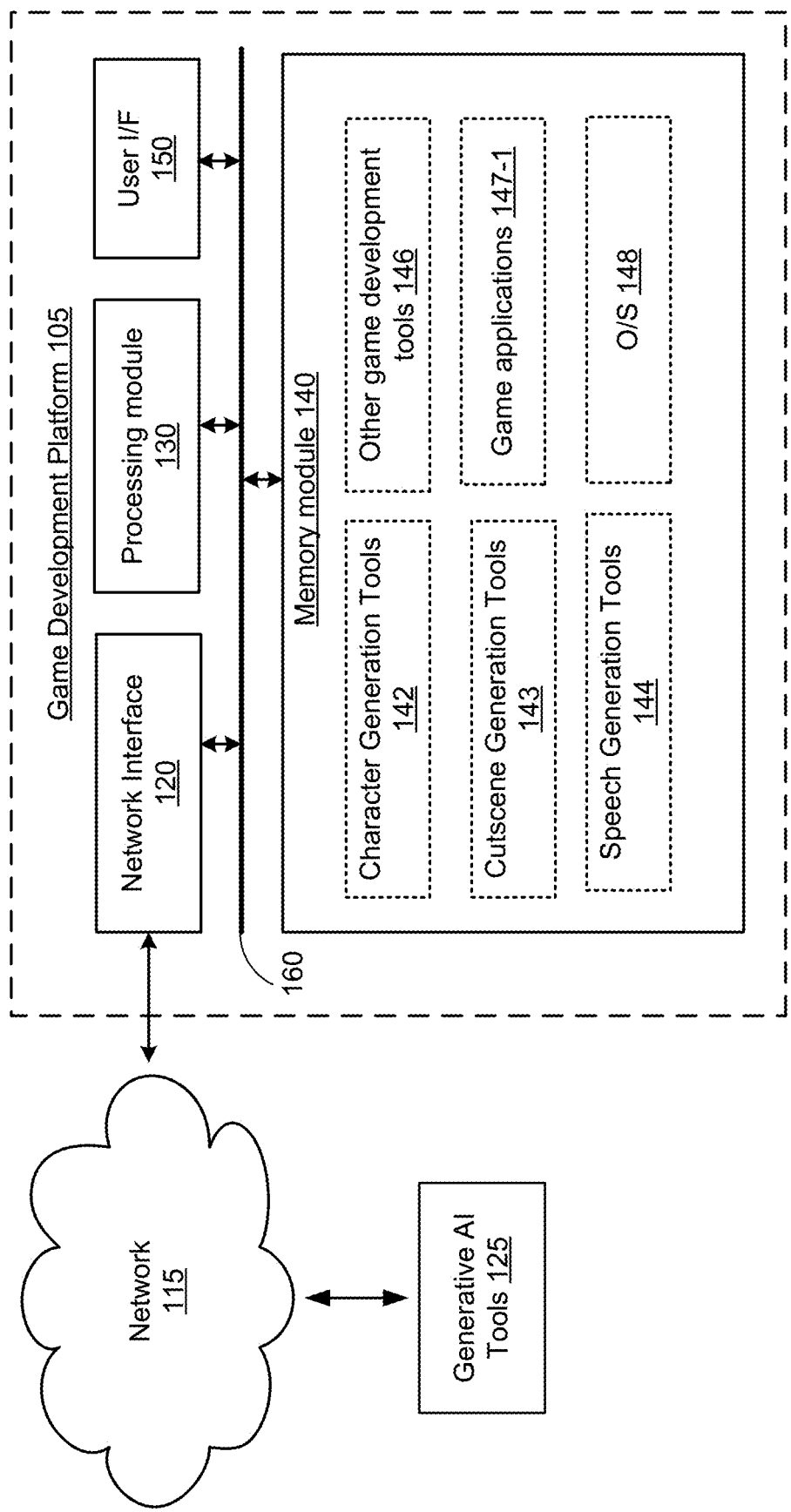
FIG. 1A presents a block diagram representation of an example system for the development of electronic games.

FIG. 1A presents a block diagram representation of an example system in accordance with various examples. In particular, a system 100-1 is presented to facilitate the creation, development, testing, balancing, improving, revision, optimizing, adaptation and/or updating of various gaming applications. Examples of such gaming/game applications include massive and other multiplayer games and/or single player games including shooter or other combat games, fantasy games or other action or adventure games, simulation games that simulate the operation of real-world vehicles, devices or systems, realtime strategy games, puzzles, sports games, role-playing games, board games or other video or digitally animated games.

The system 100-1 includes a game development platform 105 that communicates via a network 115 utilizing the network interface (I/F) 120. The network 115 can be the Internet or other wide area or local area network, either public or private. The network interface 120 can include an Ethernet interface, a Universal Serial Bus (USB) interface, an IEEE 1394 Firewire interface, and/or other wired interface, a 3G, 4G, 5G or other cellular wireless transceiver, a Bluetooth transceiver, a WiFi transceiver, UltraWideBand transceiver, WIMAX transceiver, ZigBee transceiver or other wireless interface, and/or other network card or modem for communicating via the network 115.

The game development platform 105 also includes a processing module 130 and memory module 140 that stores an operating system (O/S) 148-1 such as an Apple, Unix, Linux or Microsoft operating system or other operating system, along with applications, databases and libraries that, for example, include character generation tools 142, cutscene generation tools 143, speech generation tools 144, other game development tools 146, and game applications 147-1 that can include prior game versions as well as versions of gaming/game applications under development. In particular, the operating system (O/S) 148, character generation tools 142, cutscene generation tools 143, speech generation tools 144, other game development tools 146, and game applications 147-1 can each include operational instructions, that when executed by the processing module 130, cooperate to configure the processing module 130 into a special purpose device to perform the particular functions of the game development platform 105 described herein.

The game development platform 105 may include a one or more user interfaces (I/F) 150 such as a display device, touch screen, key pad, touch pad, joy stick, thumb wheel, a mouse, one or more buttons, a speaker, a microphone, an accelerometer, gyroscope or other motion or position sensor, video camera, eye tracker or other interface devices that provide information to one or more operators of the game development platform 105 and that generate data in response to the operators' interaction with the game development platform 105.

The processing module 130 can be implemented via a single processing device or a plurality of processing devices. Such processing devices can include a microprocessor, micro-controller, digital signal processor, microcomputer, central processing unit, quantum computing device, field programmable gate array, programmable logic device, state machine, logic circuitry, analog circuitry, digital circuitry, and/or any device that manipulates signals (analog and/or digital) based on operational instructions that are stored in a memory, such as memory module 140. The memory module 140 can include a hard disc drive or other disc drive, read-only memory, random access memory, volatile memory, non-volatile memory, static memory, dynamic memory, flash memory, cache memory, storage network and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 160, other architectures are possible including additional data buses and/or direct connectivity between one or more elements. Further, the game development platform 105 can include one or more additional elements that are not specifically shown.

In various examples, the game development platform 105 improves the technology of game development by leveraging the use of generative AI tools 125 to quickly and easily support the generation of sophisticated game content, including narratives, dialog, images of characters, scenery and/or other elements of a game including still images and video and/or other media. Examples of such generative AI tools 125 include ChatGPT, DALL-E, GPT-4 and other tools of OpenAI, as well as Midjourney, Imagen, Bard, and/or Stable Diffusion, etc. These generative AI tools 125 operate via servers, cloud computing and/or other processing systems that utilize large language models, anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. In various examples, the generative AI-tools are trained to consider trillions of records including, for example, whole libraries of images, video, literature, text, speech and/or other media. The human mind is not equipped to perform such AI techniques, not only due to the complexity of these techniques and the enormous number of records to be considered, but also due to the fact that artificial intelligence, by its very definition-requires "artificial" intelligence—i.e. machine/non-human intelligence.

It should be noted, that while the generative AI tools 125 are shown as being external to the game development platform 105, other configurations are possible where one or more of the generative AI tools 125 can be incorporated within the to the game development platform itself. It should also be noted that while character generation tools 142, cutscene generation tools 143, speech generation tools 144, other game development tools 146 are shown as being internal to the game development platform 105, in other examples, any subset of the various elements of the game development platform 105 can be implemented external to the game development platform 105 and coupled to the other components via the network 115. Furthermore, the game development platform 105 can be implemented in a cloud computing configuration with any or all of the various elements of the game development platform 105 implemented within the cloud.

Consider an example where the game development platform 105 includes character generation tools 142 and operates to perform game character development via generative AI. In particular, the processing module 130 is configured by operational instructions included within one or more elements of memory module 140 to perform the following:

receiving, via a user interface, first natural language text that includes a character description to be associated with a character of a game under development;

generating, based on the first natural language text and via a generative AI model trained on a library of images and natural language descriptions, image data corresponding to the character of the game under development;

receiving, via the user interface, second natural language text that includes an updated character description to be associated with the character of the game under development;

generating, via the generative AI model and based on the second natural language text, updated image data corresponding to the character of the game under development;

receiving, via the user interface, an indication that the updated image data is accepted; and generating, via the game development platform, the game under development to include the updated image data corresponding to the character.

In various examples, the character is a non-player character. The natural language descriptions can correspond to the library of images. The updated image data can be generated further based on the image data.

Consider an example where the game development platform 105 includes speech generation tools 144 and operates to perform game character speech development via generative AI. In particular, the processing module 130 is configured by operational instructions included within one or more elements of memory module 140 to perform the following:

receiving, via a user interface, first natural language text that includes a character description to be associated with a non-player character of a game under development;

generating, based on the first natural language text and via a first generative AI model trained on a library of images and natural language descriptions, image data corresponding to the non-player character of the game under development;

receiving, via the user interface, second natural language text that indicates a speech theme;

generating, via a second generative AI model and based on the second natural language text, speech data corresponding to the non-player character of the game under development;

receiving, via the user interface, an indication that the speech data is accepted; and generating, via the game development platform, the game under development to include the speech data corresponding to the non-player character.

Consider an example where the game development platform 105 includes cutscene development tools 143 and operates to perform game cutscene development via generative AI. In particular, the processing module 130 is configured by operational instructions included within one or more elements of memory module 140 to perform the following:

receiving, via a user interface, first natural language text that includes a character description to be associated with a non-player character of a game under development;

generating, based on the first natural language text and via a first generative AI model trained on a library of images and natural language descriptions, image data corresponding to the non-player character of the game under development;

receiving, via the user interface, second natural language text that indicates a speech theme;

generating, via a second generative AI model and based on the second natural language text, speech data corresponding to the non-player character of the game under development;

receiving, via the user interface, an indication that the speech data is accepted; and generating, via a third generative AI model and based on the image data and speech data, cutscene data corresponding to the game under development;

receiving, via the user interface, an indication that the cutscene data is accepted; and generating, via the game development platform, the game under development to include the cutscene data.

Consider an example where the game development platform 105 operates to perform game cutscene development via generative AI with character dialog. In particular, the processing module 130 is configured by operational instructions included within one or more elements of memory module 140 to perform the following:

receiving, via a user interface, first natural language text that indicates a first dialog theme associated with a first non-player character of a game under development;

receiving, via a user interface, second natural language text that indicates a second dialog theme associated with a second non-player character of a game under development;

generating, via a first generative AI model, dialog data corresponding to a dialog between the first non-player character and the second non-player character;

receiving, via the user interface, an indication that the dialog data is accepted;

generating, via a second generative AI model and based on the dialog data and image data associated with the first non-player character and the second non-player character, cutscene data corresponding to the game under development;

receiving, via the user interface, an indication that the cutscene data is accepted; and generating, via the game development platform, the game under development to include the cutscene data.

Consider an example where the game development platform 105 operates to perform game cutscene development via generative AI with seeded character dialog. In particular, the processing module 130 is configured by operational instructions included within one or more elements of memory module 140 to perform the following:

receiving, via a user interface, first natural language text that indicates a dialog seed associated with a first non-player character of a game under development;

generating, via a first generative AI model and responsive to the first natural language text, first dialog response data of a second non-player character corresponding to a dialog between the first non-player character and the second non-player character;

receiving, via the user interface, an indication that the first dialog response data is accepted;

generating, via the first generative AI model and responsive to the first dialog response data, second dialog response data of the first non-player character corresponding to the dialog between the first non-player character and the second non-player character;

receiving, via the user interface, an indication that the second dialog response data is accepted;

generating, via a second generative AI model and based on the dialog between the first non-player character and the second non-player character, cutscene data corresponding to the game under development;

receiving, via the user interface, an indication that the cutscene data is accepted; and generating, via the game development platform, the game under development to include the cutscene data.

The further operation of this system will be described in greater detail in conjunction with the figures that that follow, including many optional functions and features and examples thereof that can be used in many different combinations not expressly shown.

Figure 1B:
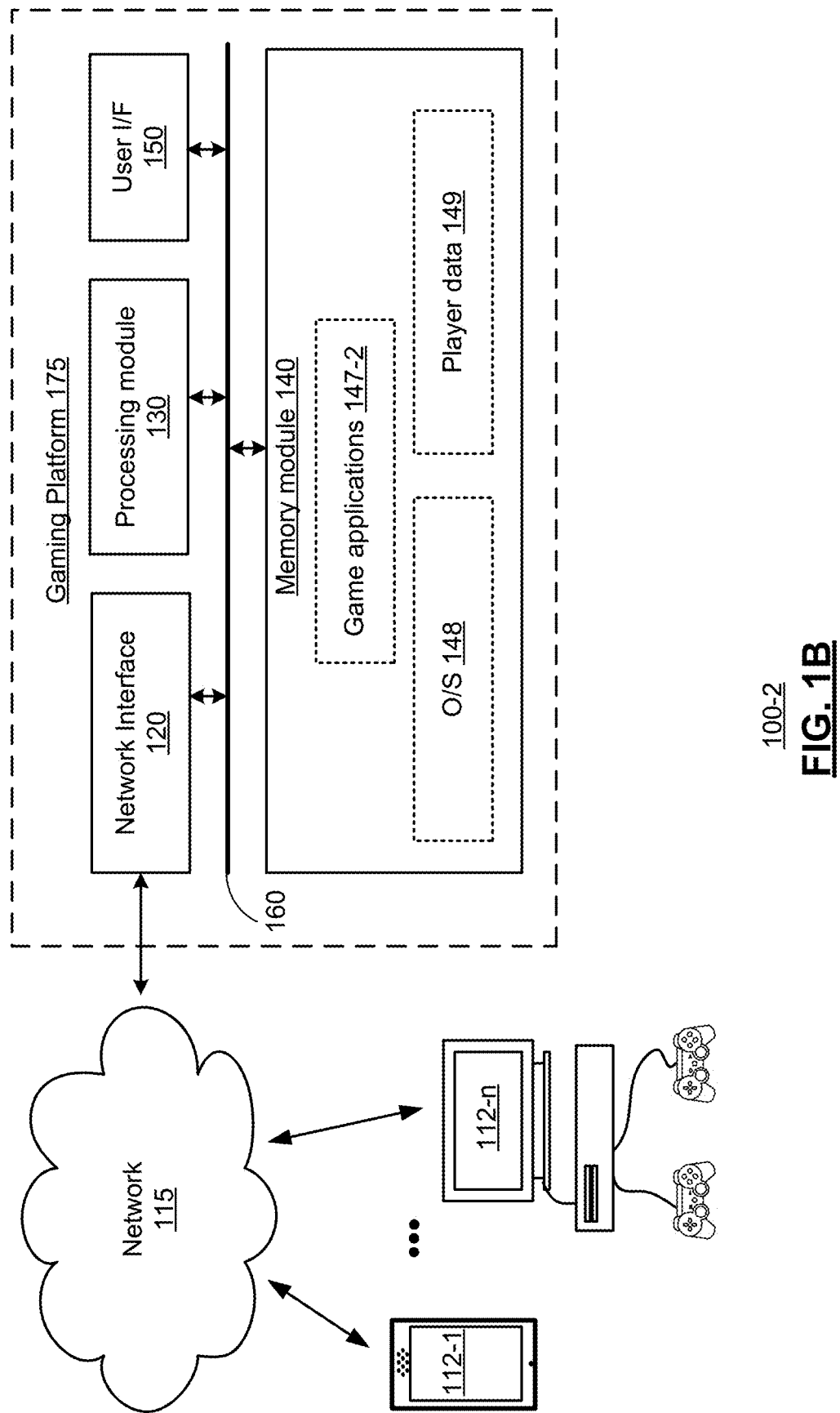
FIG. 1B presents a block diagram representation of an example system to support the play of online gaming.

FIG. 1B presents a block diagram representation of an example system to support the play of online gaming. In particular, a system 100-2 is shown having a gaming platform 175 that includes many similar elements to the game development platform 105 that are referred to by common reference numerals. The memory module 140 of gaming platform 175 stores game applications 147-2 such as one or more games 147-1 that were developed and finalized via the game development platform 105. The memory module 140 also stores player data 149 such as subscription and other account information, as well as game status one or more sets of game parameters, game player profiles or game preferences, and other content and/or other gaming data associated with players, etc. In operation, the gaming platform 175 facilitates download and/or play of the gaming applications 147-2 over the network 115 via client devices 112-1 . . . 112-n.

Figure 2A:
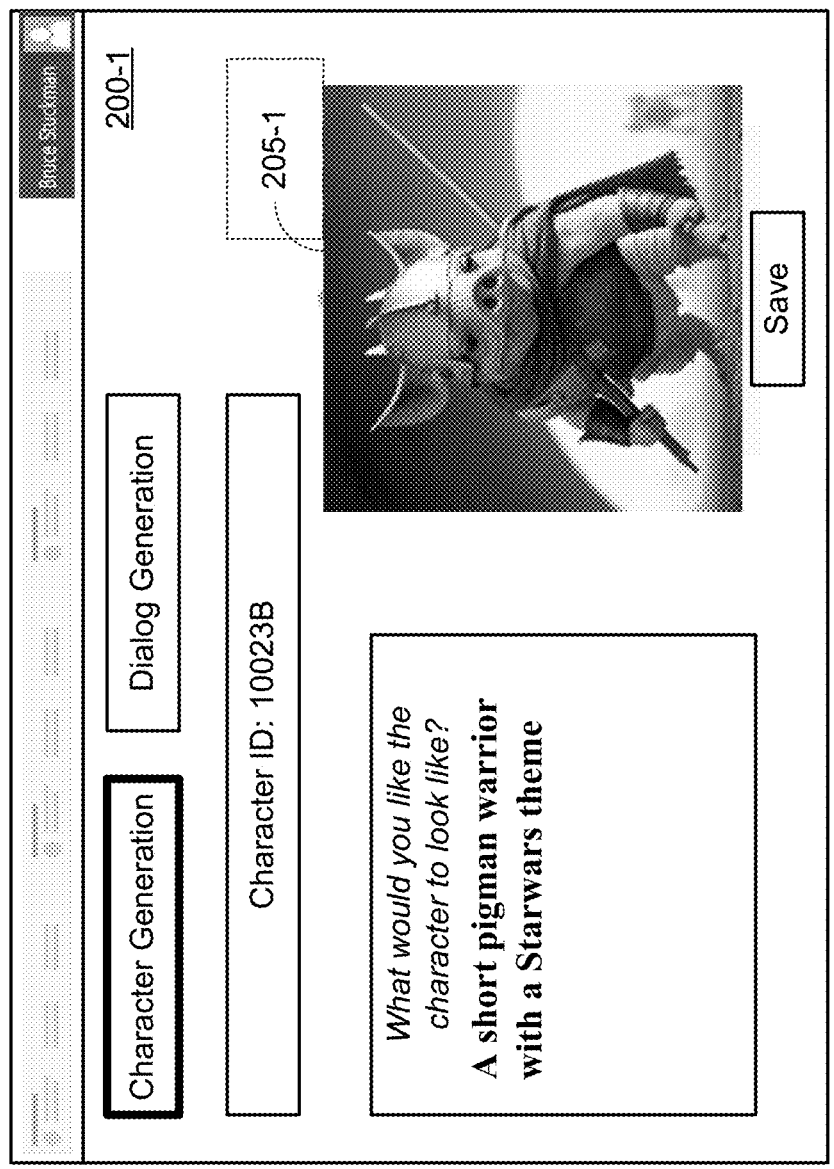
FIGS. 2A-2E present pictorial representations of example screen displays.
Figure 2B:
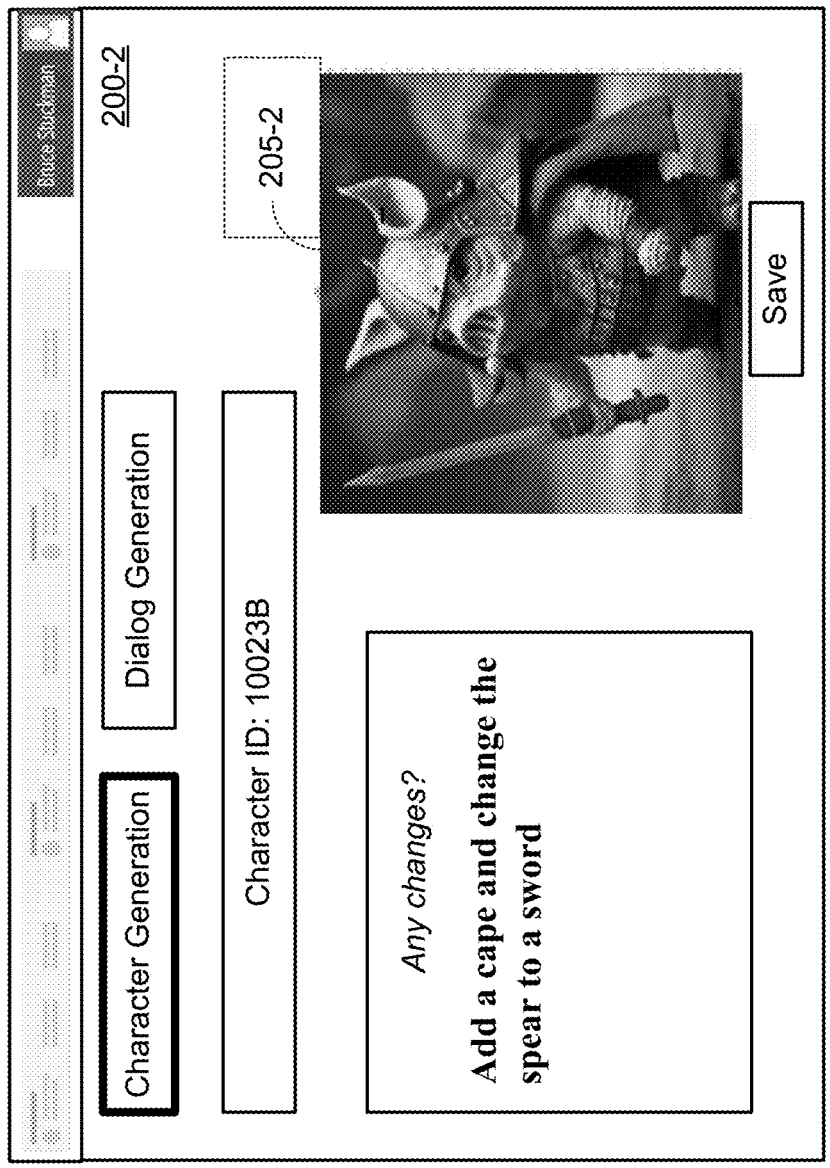
Figure 2C:
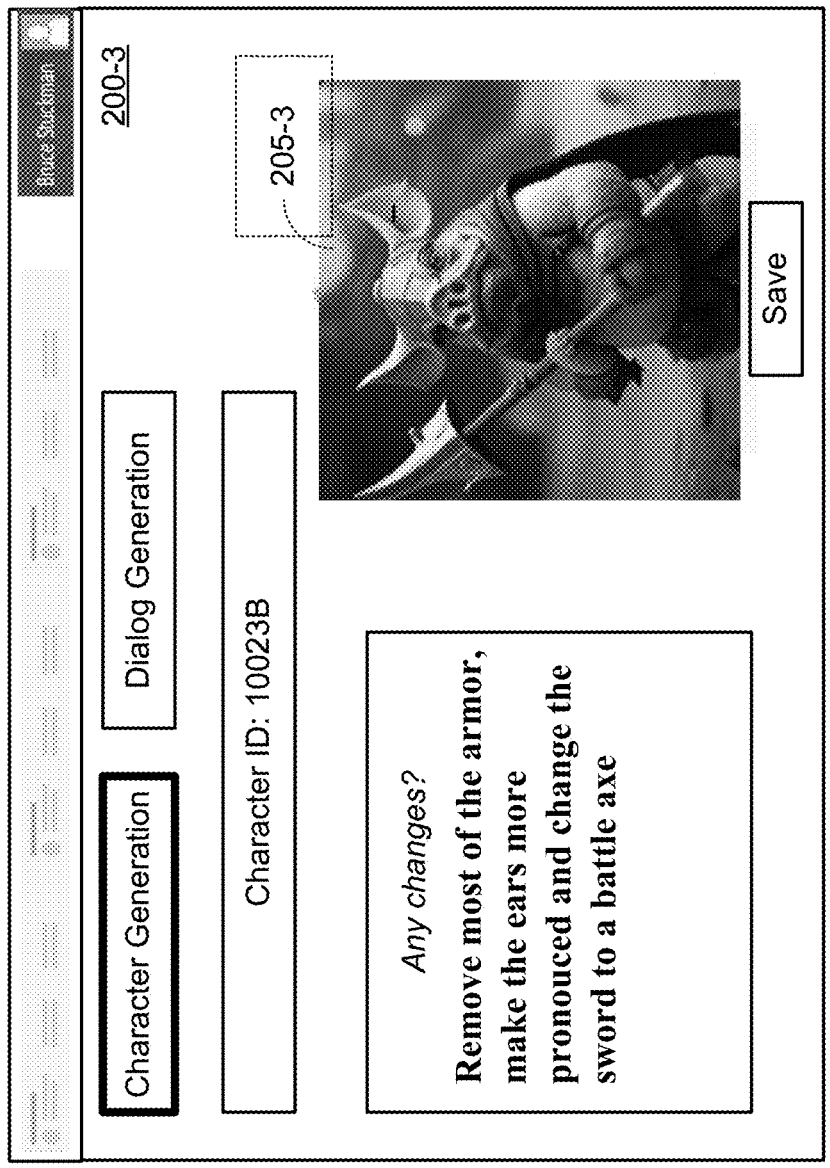
Figure 2D:
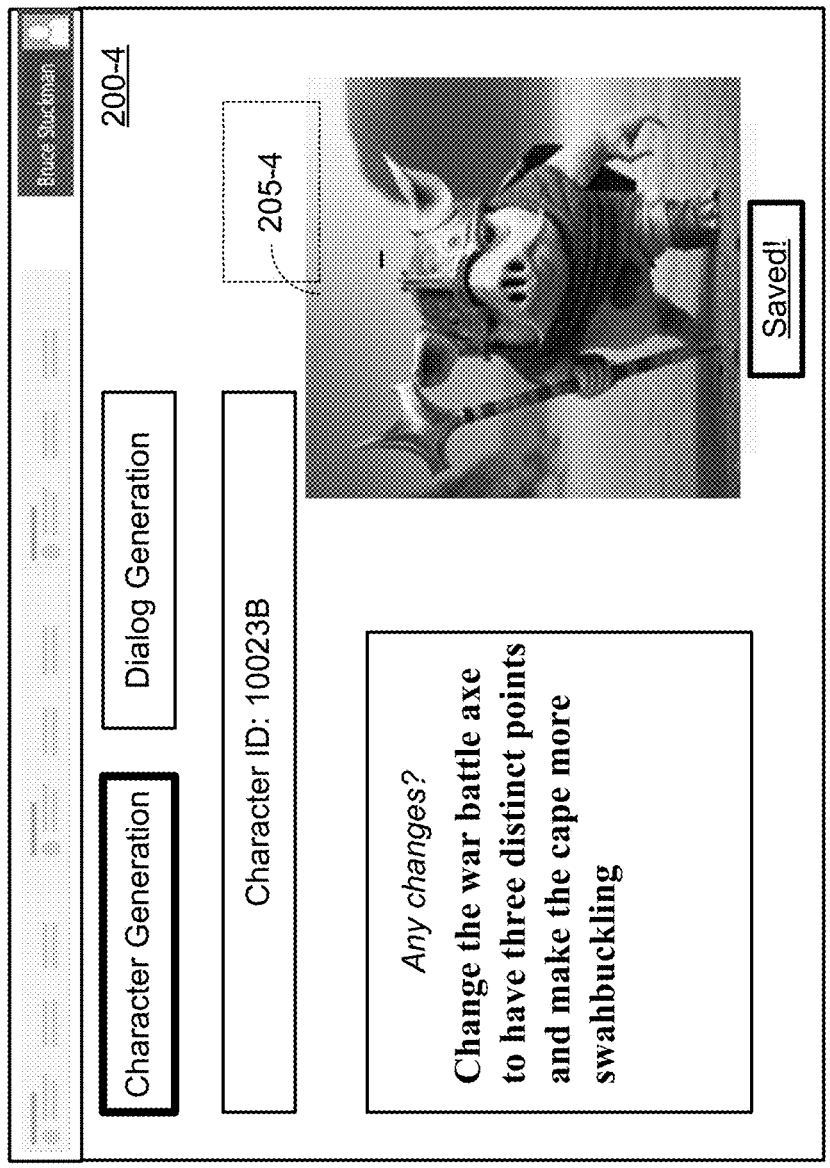
Figure 2E:
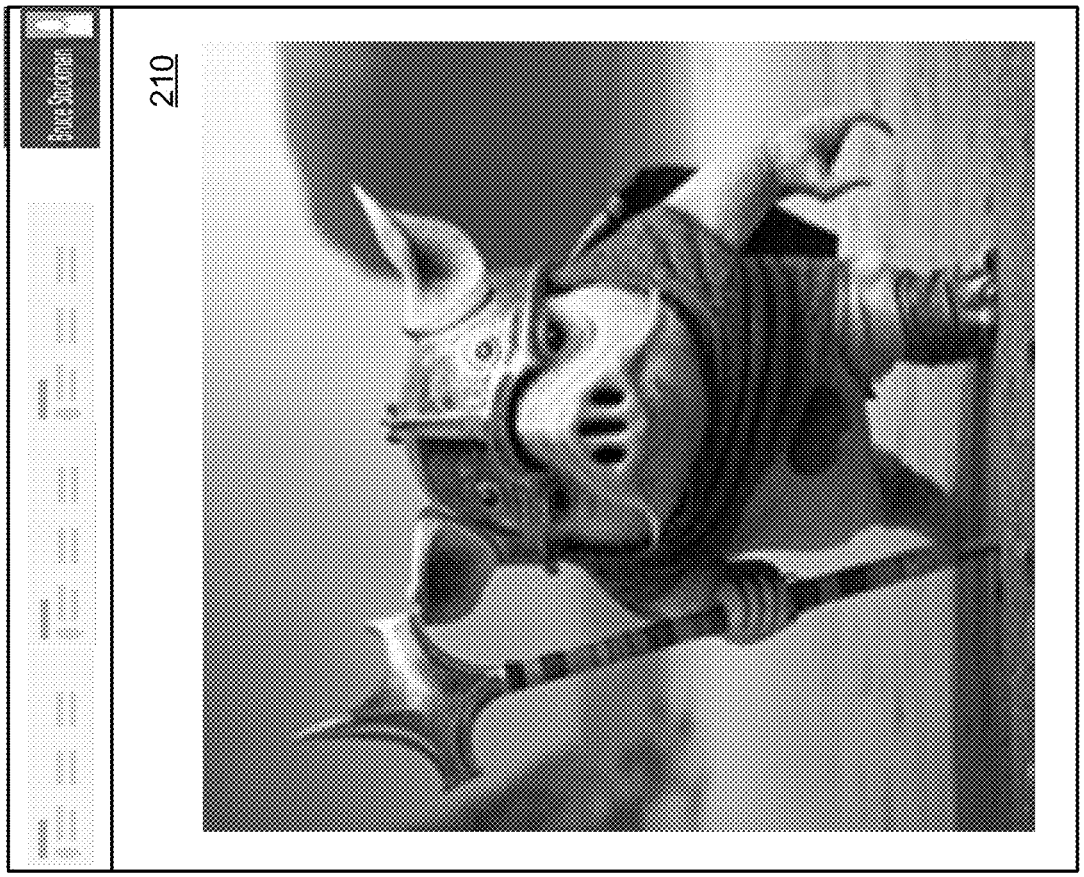

FIGS. 2A-2D present pictorial representations of example screen displays 200-1, 200-2, 200-3, and 200-4. As previously discussed, the game development platform 105 can operate to perform game character development via generative AI. In particular, a screen display 200-1 of FIG. 2A shows an interactive user interface the responds to action of the user to receive first natural language text that includes a character description to be associated with a character (such as a non-player character) of a game under development. The game development platform 105 has generated, based on the first natural language text and via a generative AI model (e.g., via Midjourney or another image generator included in the generative AI tools 125 that is trained on a library of images and natural language descriptions), image data 205-1 corresponding to the character of the game under development. Screen display 200-2 of FIG. 2B shows an interactive user interface responds to actions of the user to receive second natural language text that includes an updated character description to be associated with the character of the game under development. In the example shown, merely the changes are presented, but in other examples, the full updated description could be input, based on the operation of the particular generative AI model. The game development platform 105 then generates, via the generative AI model and based on the second natural language text, updated image data 205-2, e.g. new imagery corresponding to the character of the game under development. This process is repeated again in FIG. 2C via screen display 200-3 and updated image 205-3 and again via screen display 200-4 and updated image 205-4 until the interface receives an indication that the updated image data is accepted (saved) in FIG. 2D. In response, the game development platform 105 can generate/update the game under development to include the updated image data 205-4 corresponding to the character. For example, the image data corresponding to the character can be included in a character library or other database, code or data used to implement the game. An example screen display 210 of the finished character in the completed game is shown in FIG. 2E.

Figure 2F:
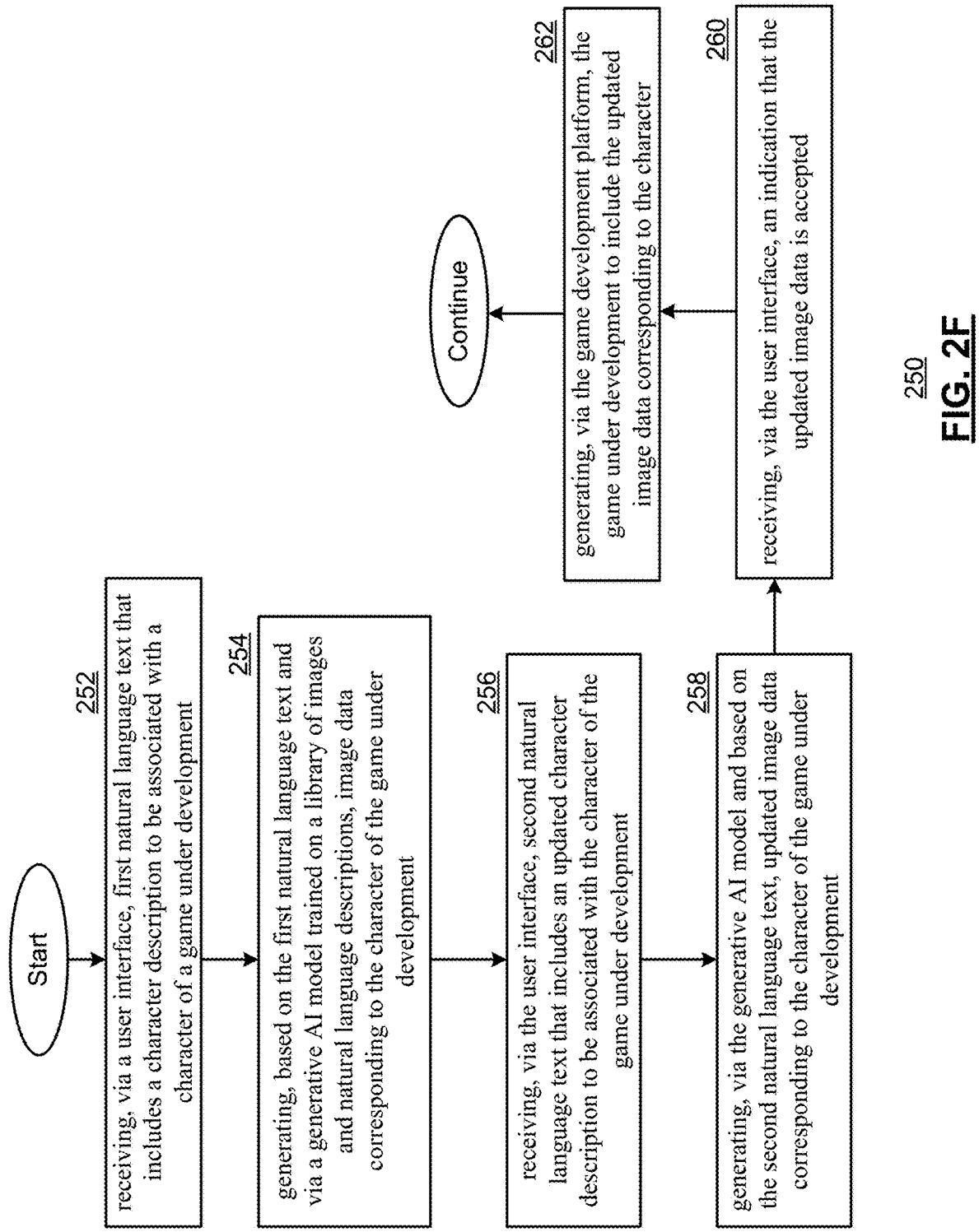
FIG. 2F presents a flowchart representation of an example method.

FIG. 2F presents a flowchart representation of an example method. In particular, a method 250 is presented for use in conjunction with game development platform 105 and/or any of the functions and features described herein. Step 252 includes receiving, via a user interface, first natural language text that includes a character description to be associated with a character of a game under development. Step 254 includes generating, based on the first natural language text and via a generative AI model trained on a library of images and natural language descriptions, image data corresponding to the character of the game under development. Step 256 includes receiving, via the user interface, second natural language text that includes an updated character description to be associated with the character of the game under development. Step 258 includes generating, via the generative AI model and based on the second natural language text, updated image data corresponding to the character of the game under development. Step 260 includes receiving, via the user interface, an indication that the updated image data is accepted. Step 262 includes generating, via the game development platform, the game under development to include the updated image data corresponding to the character.

Figure 3A:
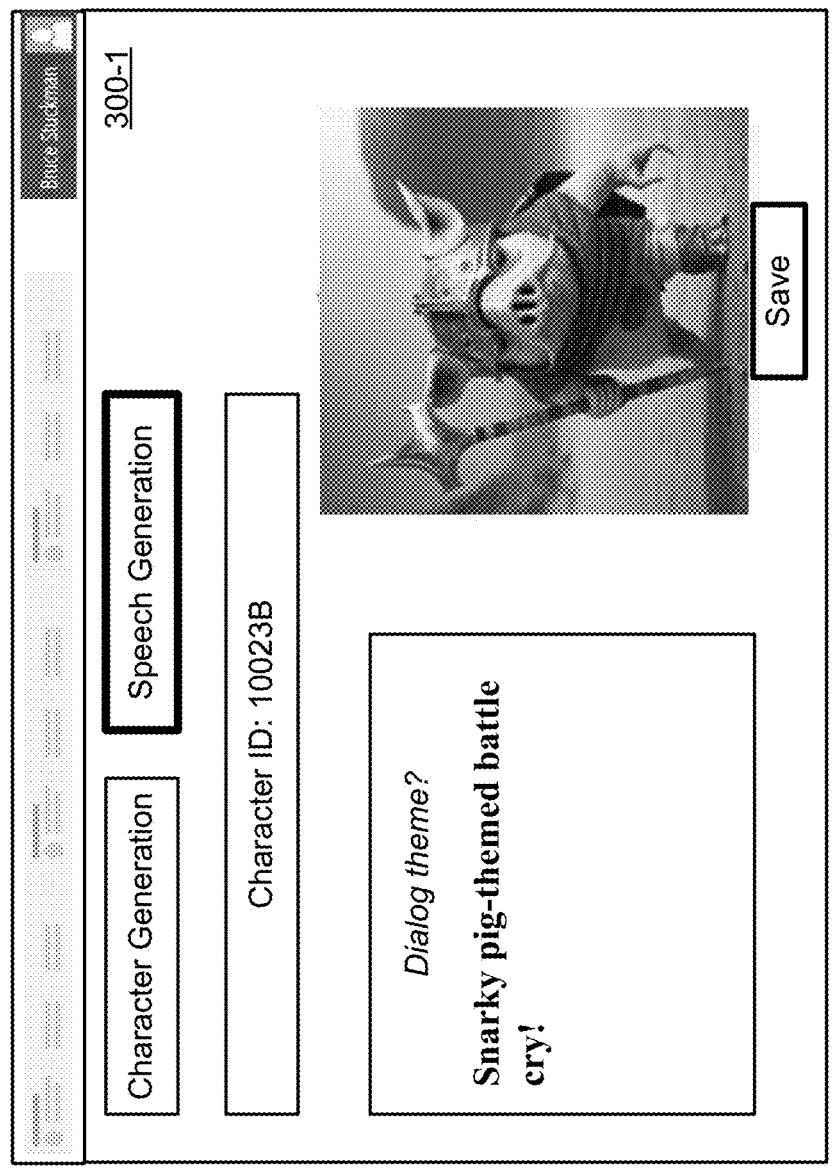
FIGS. 3A-3D present pictorial representations of example screen displays.
Figure 3B:
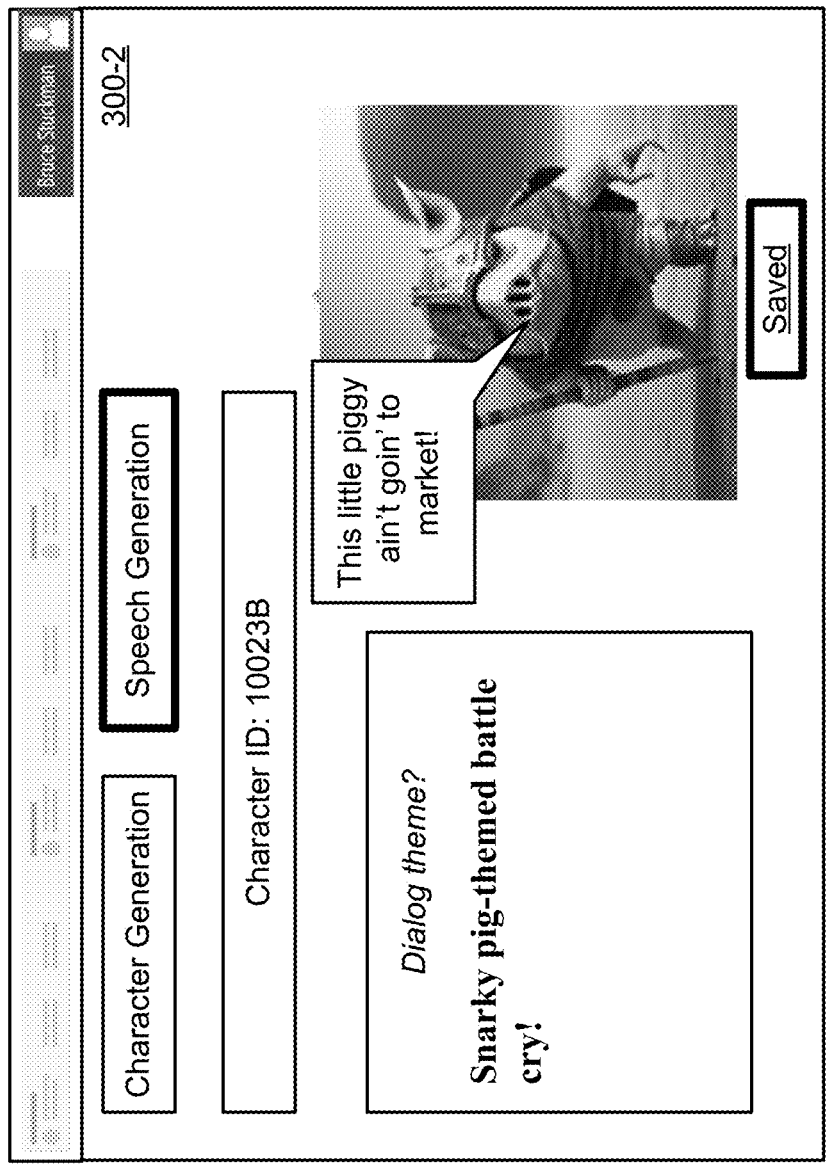

FIGS. 3A-3B present pictorial representations of example screen displays 300-1 and 300-2. As previously discussed, the game development platform 105 can operate to perform game character development via generative AI with speech. In particular, a screen display 200-1 of FIG. 2A shows an interactive user interface the responds to action of the user to receive natural language text that indicates a speech theme to be associated with a non-player character. The game development platform 105 generates a generative AI model (e.g., a natural language text generator included in generative AI tools 125) based on the natural language text, speech data corresponding to the non-player character of the game under development as shown in screen display 300-2 of FIG. 3B and receives an indication via the user interface that the speech data is accepted.

Figure 3C:
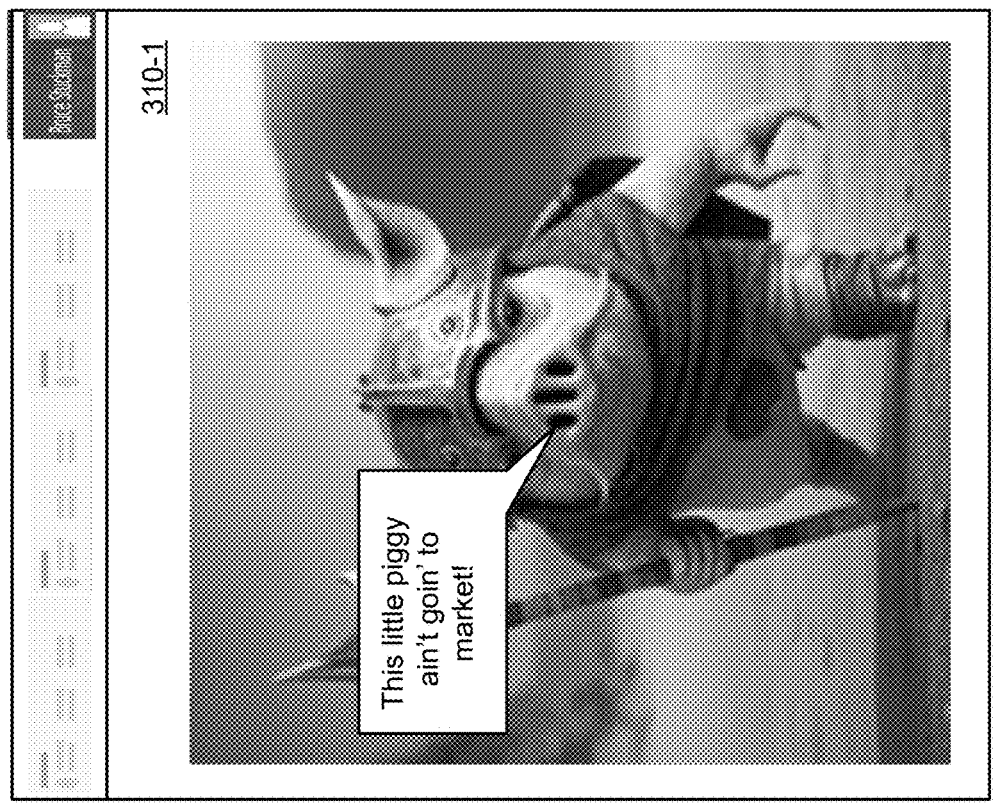
Figure 3D:
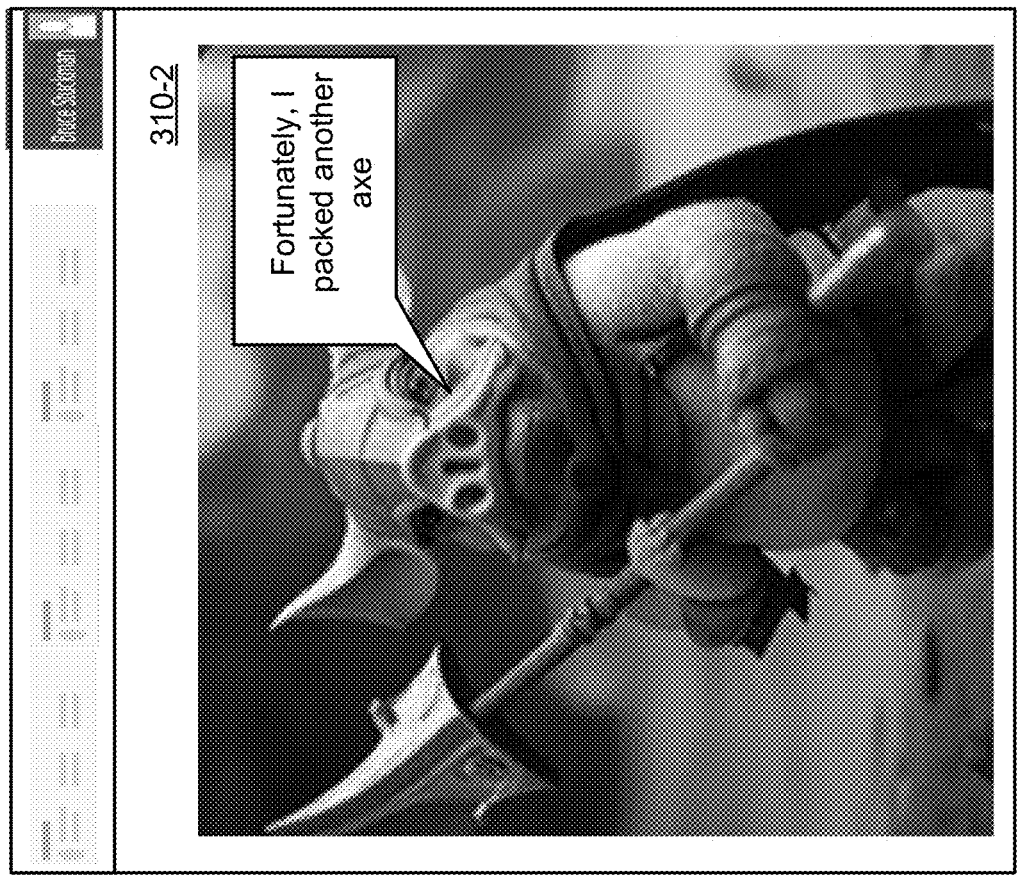

An example screen display 310-1 of the finished character speech in the completed game is shown in FIG. 3C. While the utterance of the non-player character is shown via a text box, in other examples, actual speech audio can be generated either with, or without, simulated lip movements of the character. In further examples, multiple versions of a single non-player character can be generated along with multiple utterances and triggered based on events that occur in the game itself. In the example of FIG. 3D shown in screen display 310-2, the character has had his battle axe knocked away. As a result of this game event, the character image data has been updated to reflect a secondary weapon (based on previously saved variants of the image generated utilizing the generative AI tools 125) and, as a result, corresponding speech data previously generated utilizing the generative AI tools 125 is also presented to correspond to the occurrence of this event within the game.

Figure 3E:
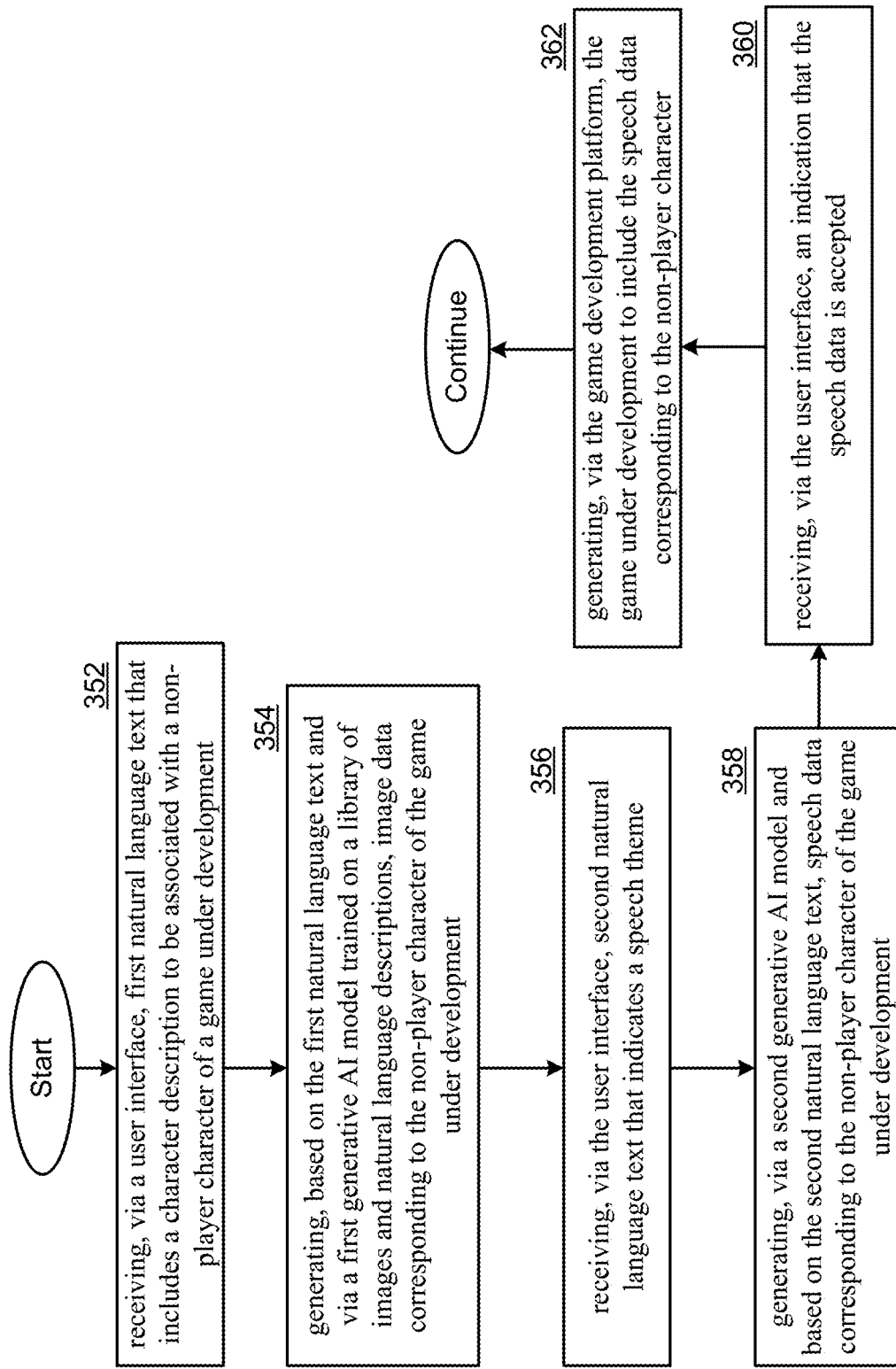
FIG. 3E presents a flowchart representation of an example method.

FIG. 3E presents a flowchart representation of an example method. In particular, a method 350 is presented for use in conjunction with game development platform 105 and/or any of the functions and features described herein. Step 352 includes receiving, via a user interface, first natural language text that includes a character description to be associated with a non-player character of a game under development. Step 354 includes generating, based on the first natural language text and via a first generative AI model trained on a library of images and natural language descriptions, image data corresponding to the non-player character of the game under development. Step 356 includes receiving, via the user interface, second natural language text that indicates a speech theme. Step 358 includes generating, via a second generative AI model and based on the second natural language text, speech data corresponding to the non-player character of the game under development. Step 360 includes receiving, via the user interface, an indication that the speech data is accepted. Step 362 includes generating, via the game development platform, the game under development to include the speech data corresponding to the non-player character.

Figure 4A:
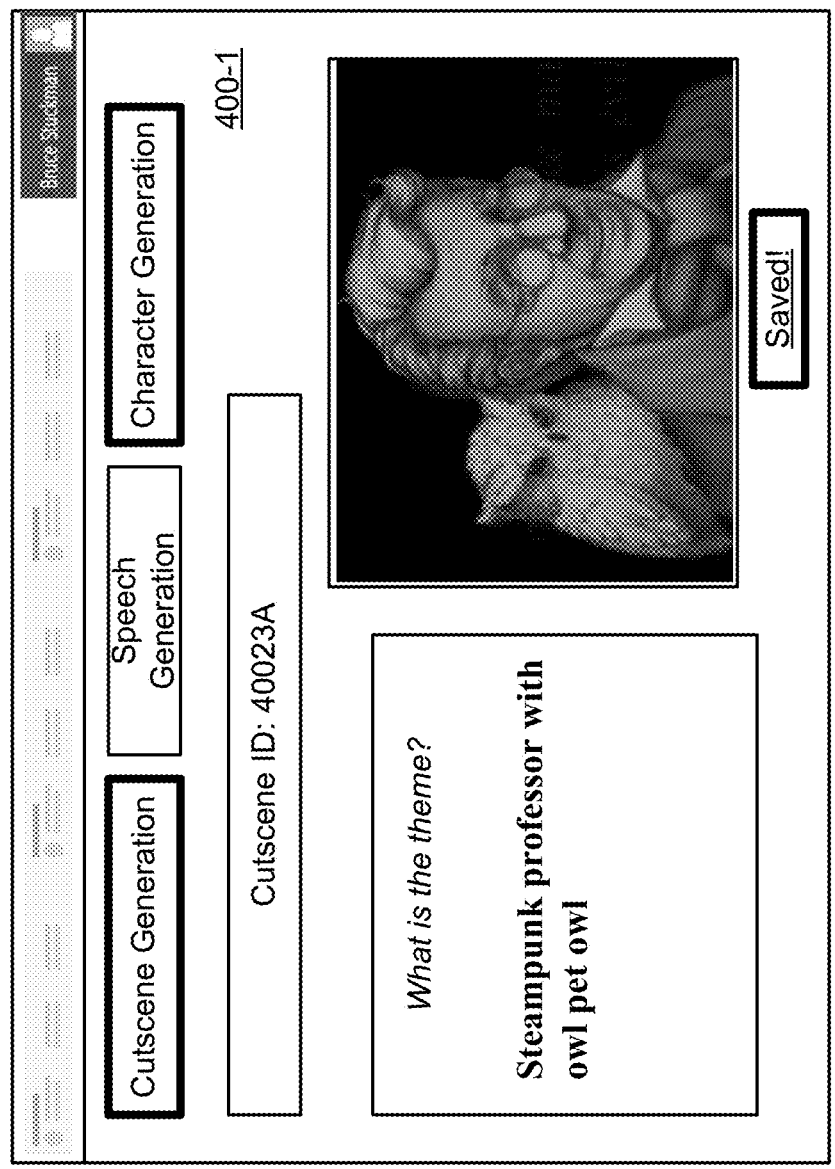
FIGS. 4A-4C present pictorial representations of example screen displays.
Figure 4B:
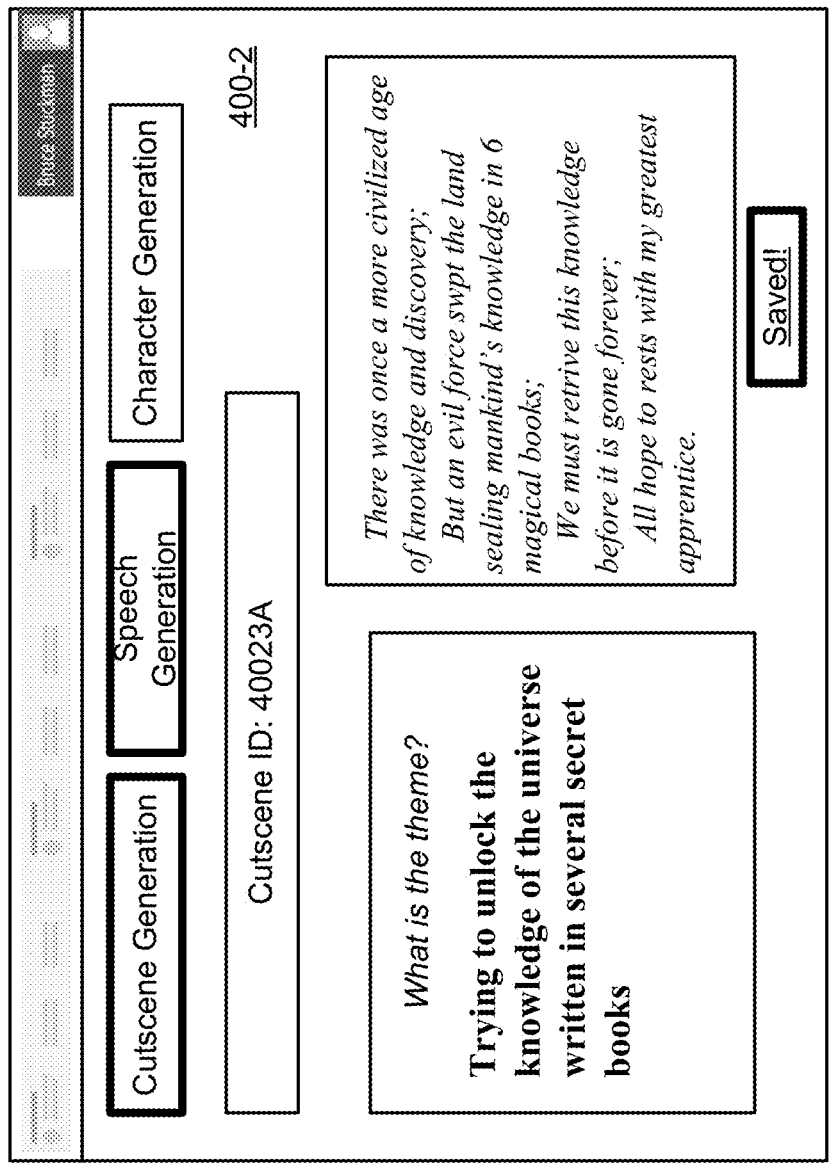
Figure 4C:
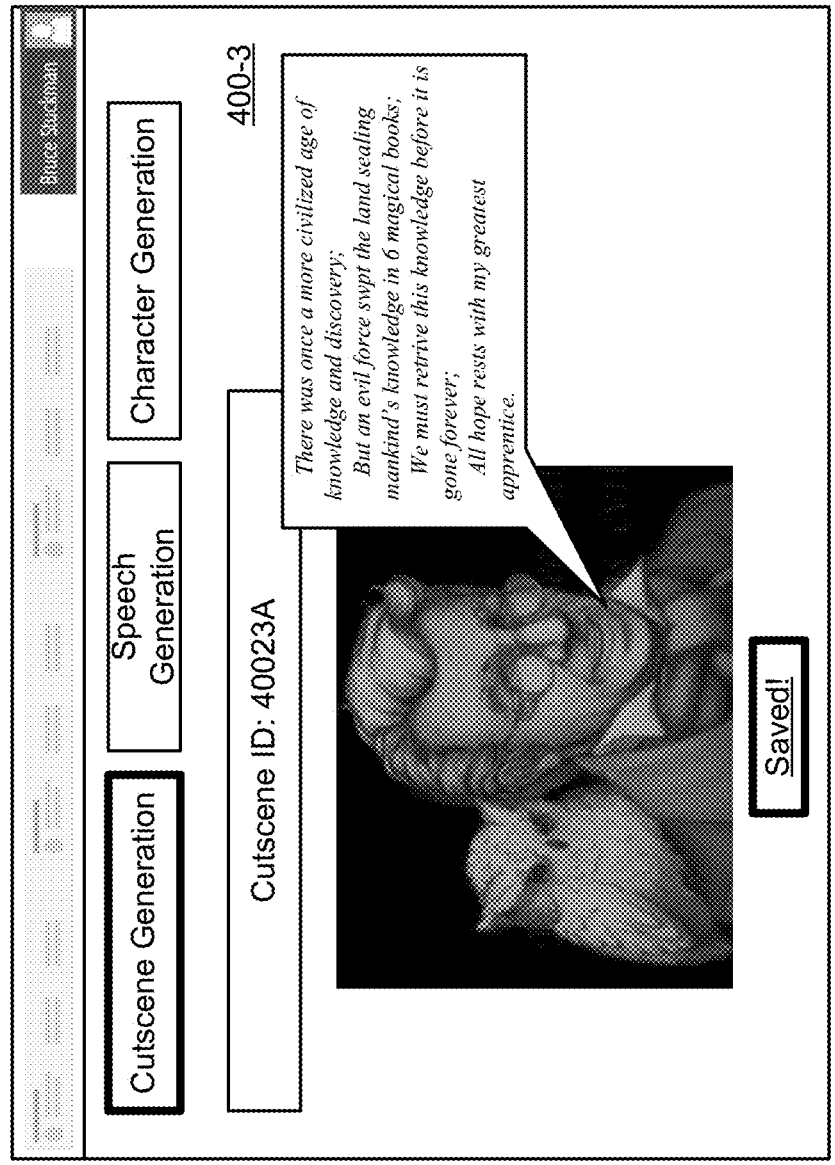

FIGS. 4A-4C present pictorial representations of example screen displays 400-1, 400-2 and 400-3. As previously discussed, the game development platform 105 can operate to perform game cutscene development via generative AI. This cutscene can be a non-player interactive sequence of images and/or video that includes narrative, dialog or other speech by one or more non-player characters.

In particular, a screen display 400-1 of FIG. 4A shows an interactive user interface that responds to action of the user to receive first natural language text that includes a character description to be associated with a non-player character of a game under development. The game development platform 105 then generates, based on the first natural language text and via a generative AI model (e.g., an image generator included in the generative AI tools 125 that is trained on a library of images and natural language descriptions), image data corresponding to the character of the game under development. In the example shown, the user has chosen to save this image of the non-player character.

Screen display 400-2 of FIG. 4B shows an interactive user interface that responds to action of the user to receive second natural language text that indicates a speech theme. The game development platform 105 then generates, via a second generative AI model (such as a speech generation tool included in the AI generative tools 125) and based on the second natural language text, speech data corresponding to the non-player character of the game under development. In the example shown, the user has indicated, via the user interface, to save this speech data corresponding to the non-player character.

Screen display 400-3 of FIG. 4C shows an interactive user interface that responds to action of the user to generate, via a third generative AI model (included in AI generative tools 125) and based on the image data and speech data, cutscene data such as video or other image sequences corresponding to the game under development. While the utterance of the non-player character is shown via a text box, in other examples, actual speech audio can be generated either with, or without, simulated lip movements of the character. In the example shown, the user has indicated, via the user interface, to save this cutscene data for incorporation in the completed game.

Figure 4D:
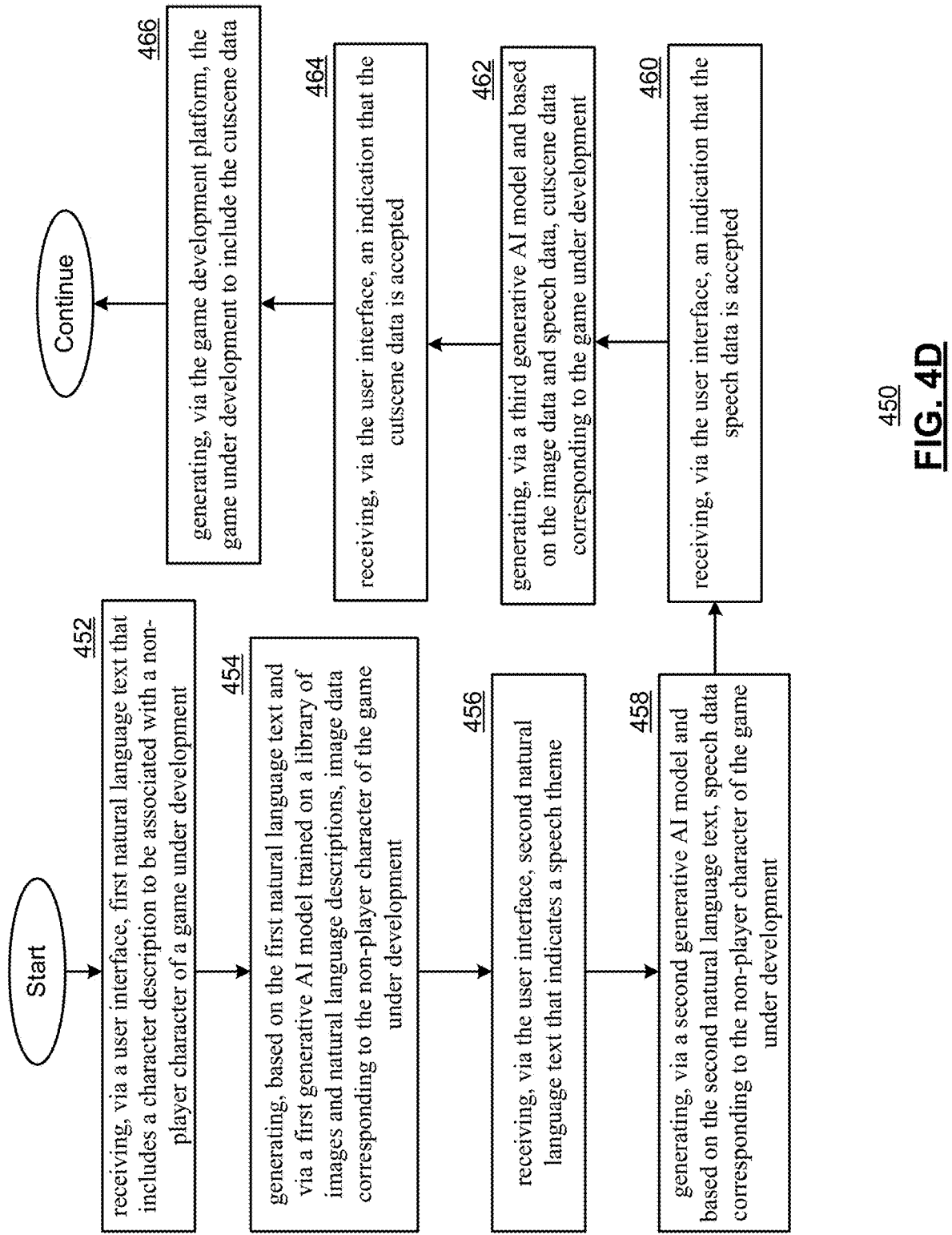
FIG. 4D presents a flowchart representation of an example method.

FIG. 4D presents a flowchart representation of an example method. In particular, a method 450 is presented for use in conjunction with game development platform 105 and/or any of the functions and features described herein. Step 452 includes receiving, via a user interface, first natural language text that includes a character description to be associated with a non-player character of a game under development. Step 454 includes generating, based on the first natural language text and via a first generative AI model trained on a library of images and natural language descriptions, image data corresponding to the non-player character of the game under development. Step 456 includes receiving, via the user interface, second natural language text that indicates a speech theme. Step 458 includes generating, via a second generative AI model and based on the second natural language text, speech data corresponding to the non-player character of the game under development. Step 460 includes receiving, via the user interface, an indication that the speech data is accepted. Step 462 includes generating, via a third generative AI model and based on the image data and speech data, cutscene data corresponding to the game under development. Step 464 includes receiving, via the user interface, an indication that the cutscene data is accepted. Step 466 includes generating, via the game development platform, the game under development to include the cutscene data.

FIGS. 5A-5E present pictorial representations of example screen displays 500-1, 500-2, 500-3, 500-4 and 500-5. As previously discussed, the game development platform 105 can operate to perform game cutscene development via generative AI with dialog between two or more non-player characters.

Figure 5A:
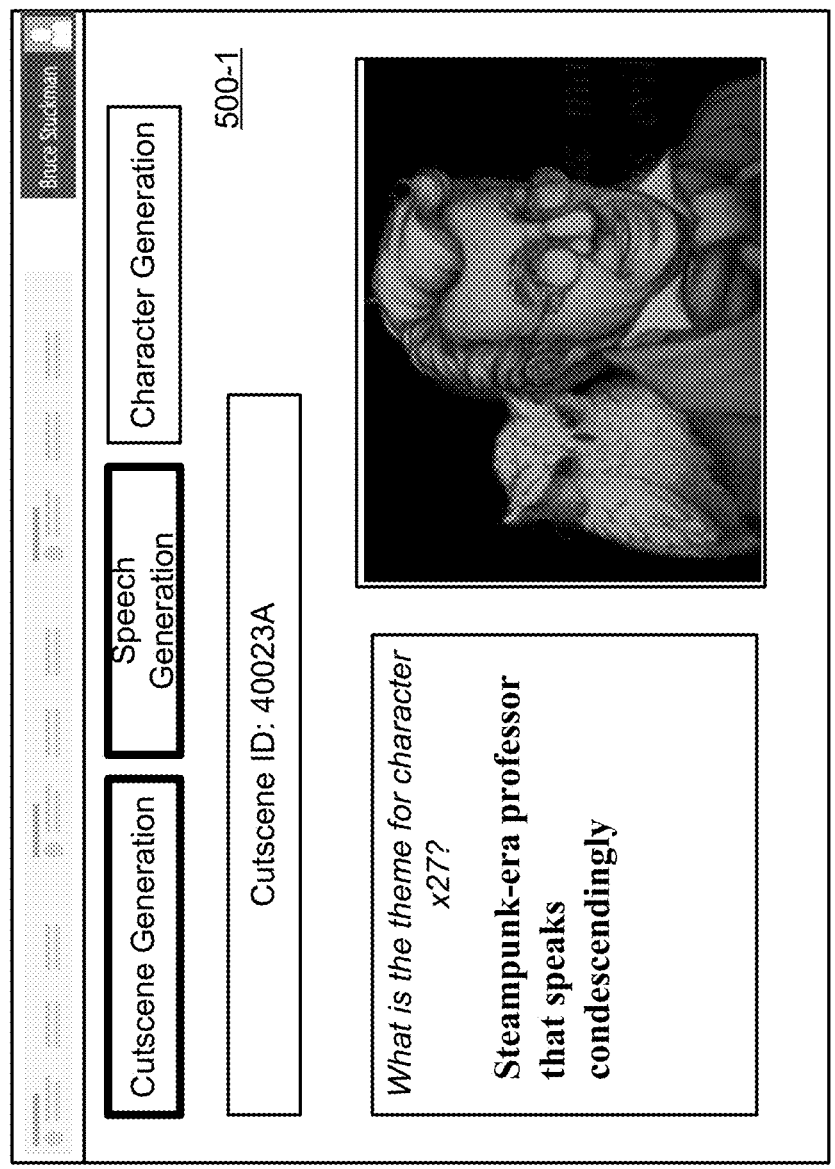
FIGS. 5A-5E present pictorial representations of example screen displays.
Figure 5B:
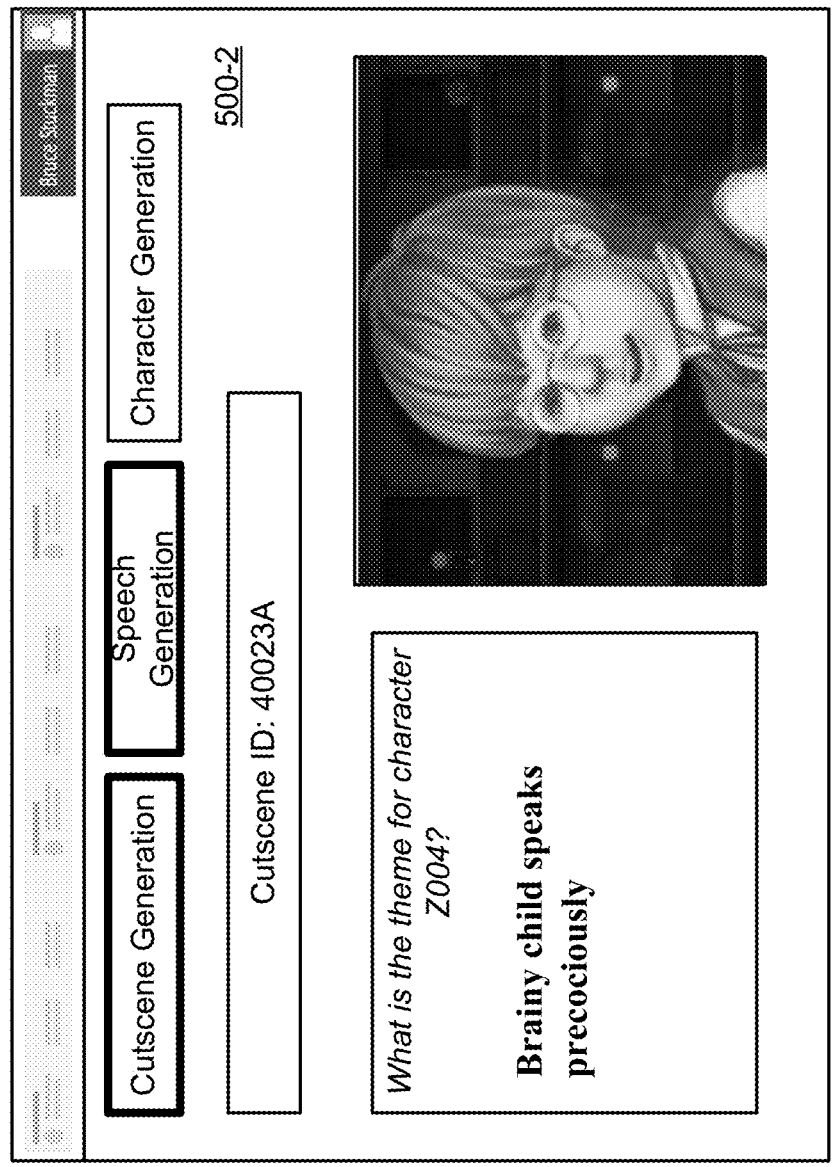
Figure 5C:
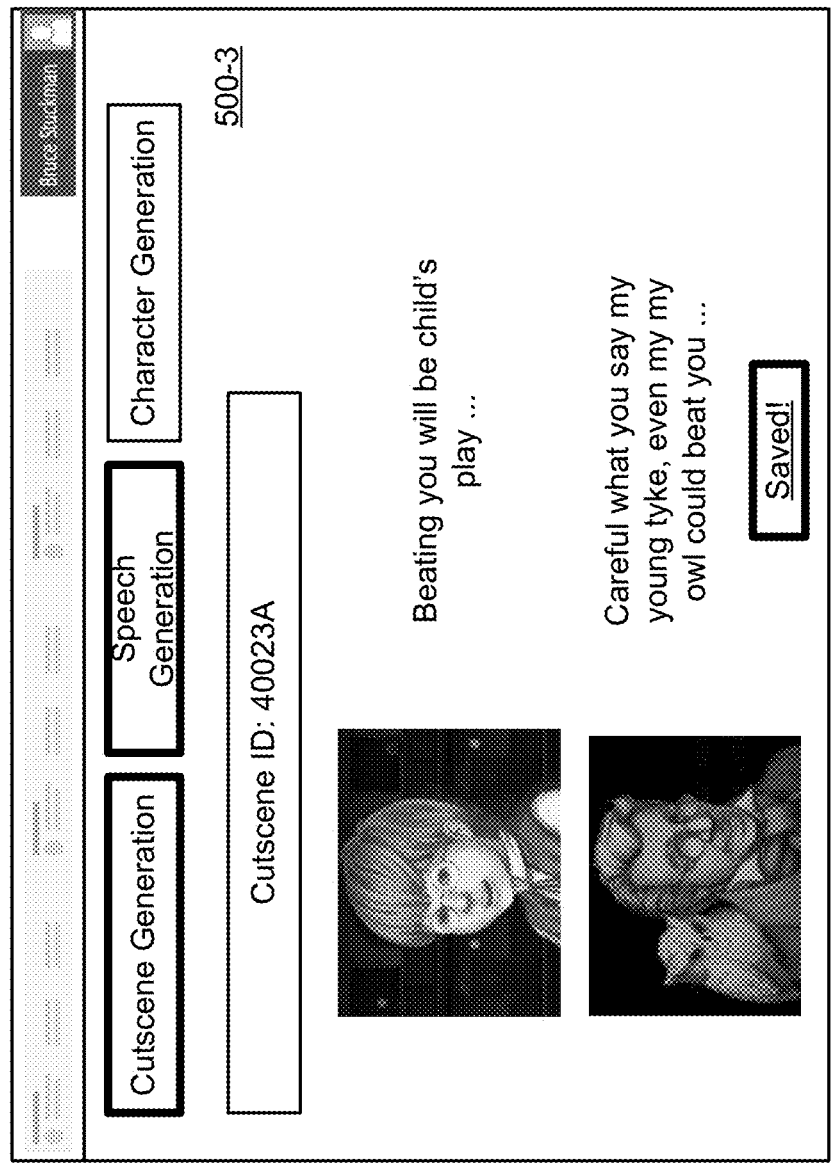

In particular, a screen display 500-1 of FIG. 5A shows an interactive user interface that responds to action of the user to receive first natural language text that includes a dialog theme to be associated with a first non-player character of a game under development. Screen display 500-2 of FIG. 5B shows an interactive user interface that responds to actions of the user to receive second natural language text that includes a dialog theme to be associated with a second non-player character of a game under development.

The game development platform 105 then generates, based on the first and second natural language text and via a generative AI model (e.g., or another dialog generator included in the generative AI tools 125). The results are shown in screen display 500-3 of FIG. 5C. In the example shown, the dialog of the second character is generated to respond to the dialog by the first character. The user has chosen to save this dialog between non-player characters. It should be noted however, that longer dialog exchanges between characters can be generated in a similar fashion, so that each character responds to the prior utterance(s) of the other character and further conditioned on the earlier dialog data for both itself and the other character. Furthermore, the initial dialog of one character can be generated either automatically or manually and fed to a chatbot (e.g. ChatGPT) that iteratively generates the dialog responses between NPCs.

Figure 5D:
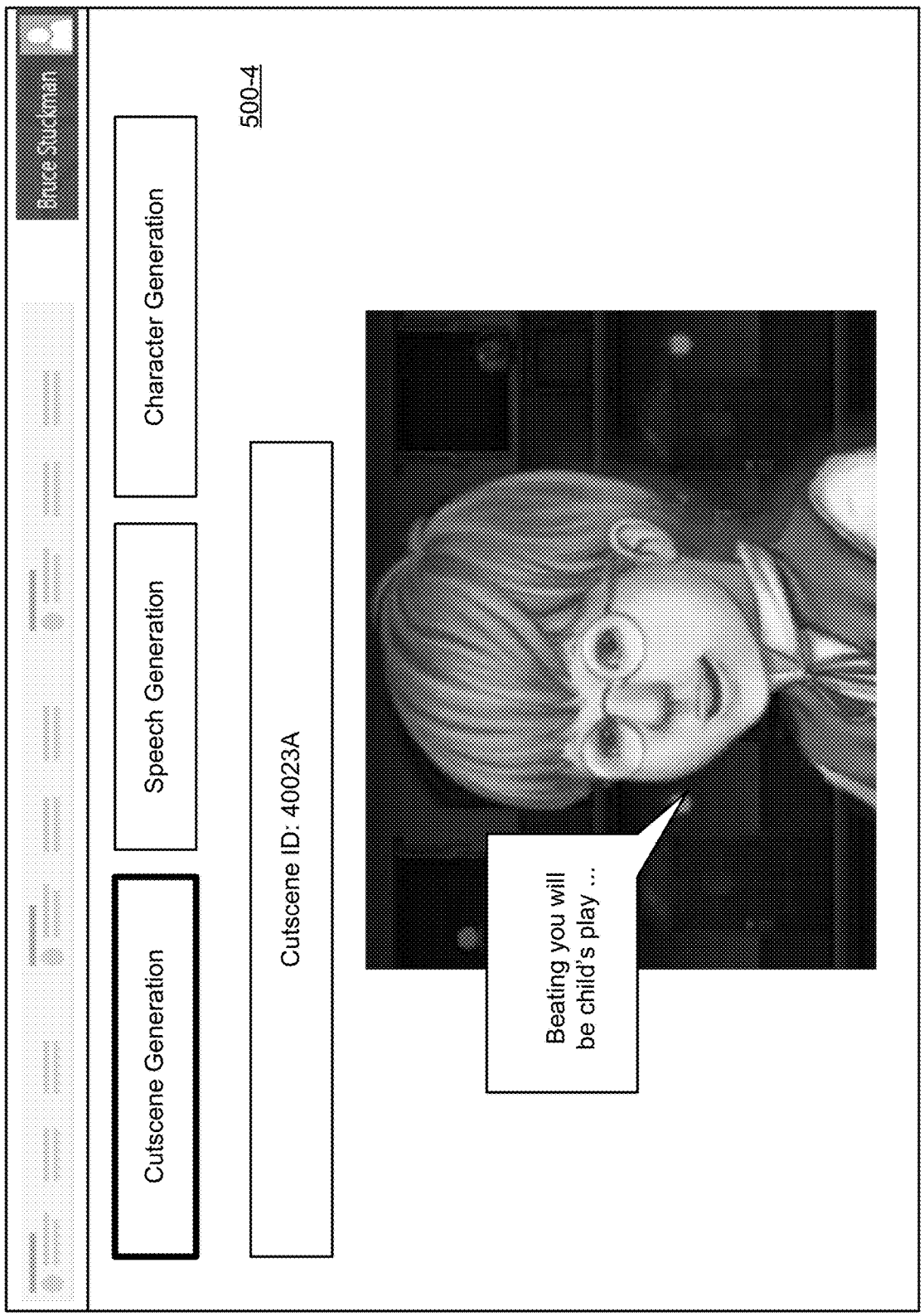
Figure 5E:
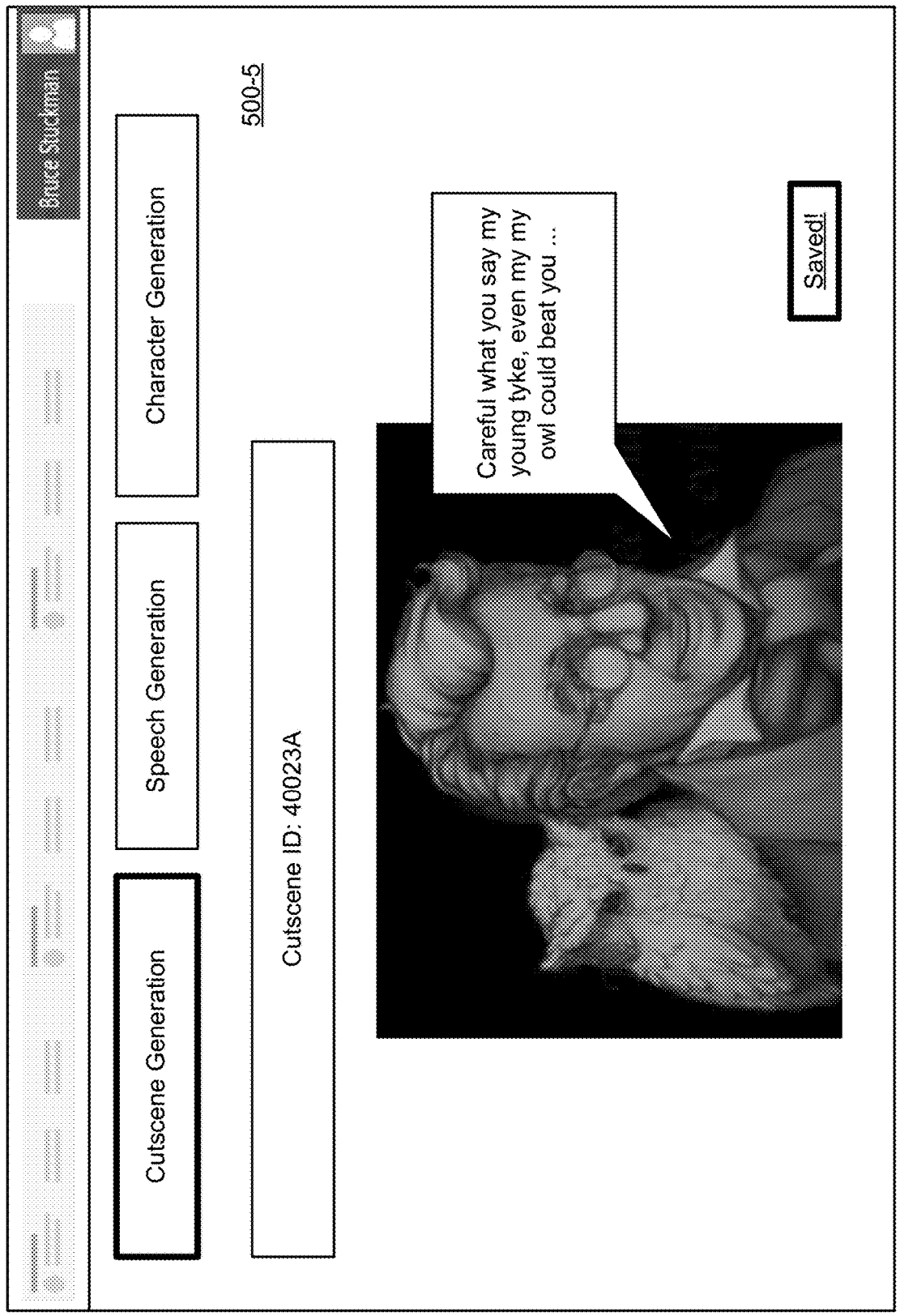

Screen display 500-4 of FIG. 5D shows an interactive user interface that responds to action of the user to generate, via a third generative AI model (included in AI generative tools 125) and based on image data corresponding to the non-player characters and the dialog data, cutscene data corresponding to the game under development. While the utterance of the non-player character is shown via a text box, in other examples, actual speech audio can be generated either with, or without, simulated lip movements of the character. The cutscene continues with additional dialog in screen display 500-5 of FIG. 5E. In the example shown, the user has indicated, via the user interface, to save this cutscene data for incorporation in the completed game.

Figure 5F:
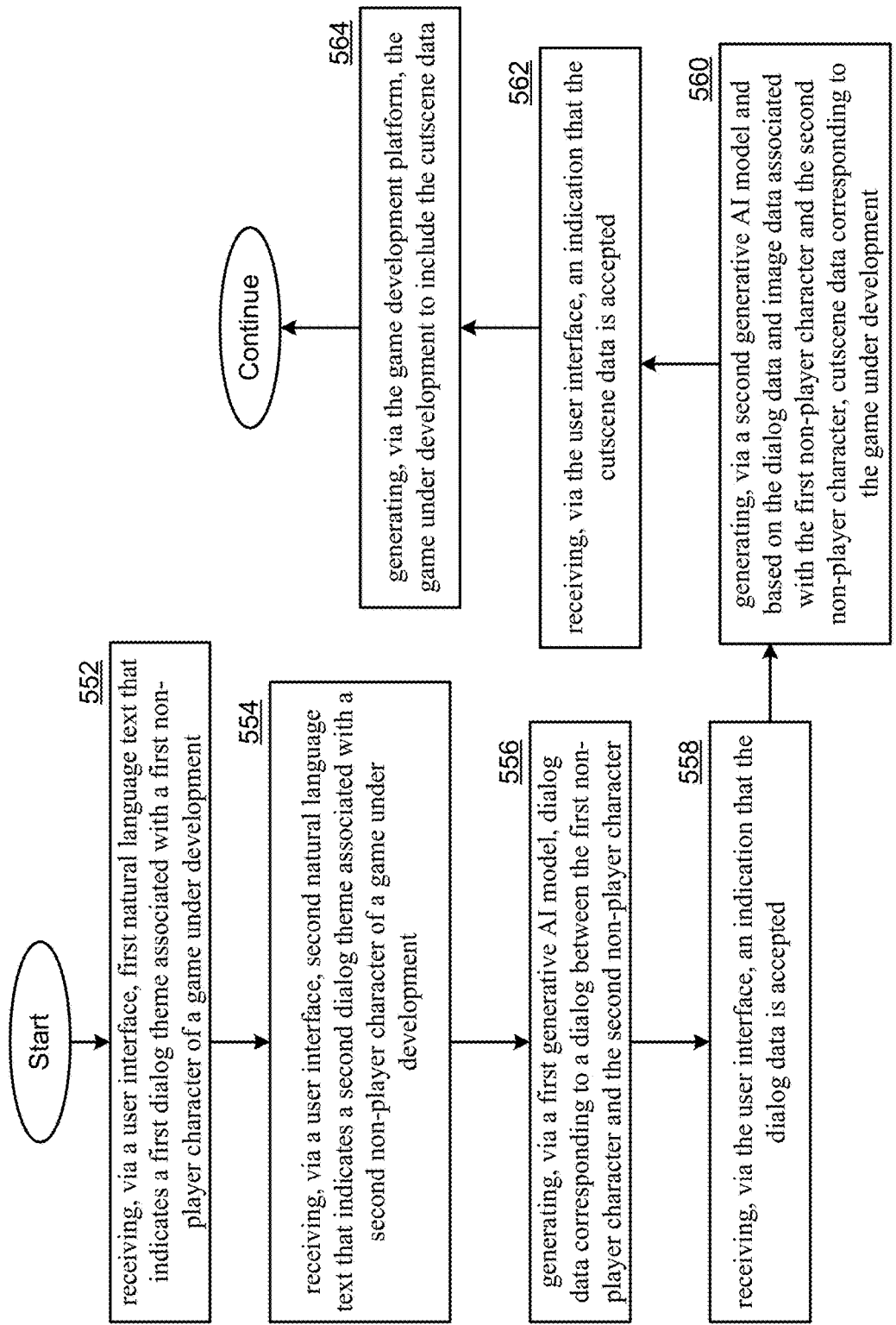
FIG. 5F presents a flowchart representation of an example method.

FIG. 5F presents a flowchart representation of an example method. In particular, a method 550 is presented for use in conjunction with game development platform 105 and/or any of the functions and features described herein. Step 552 includes receiving, via a user interface, first natural language text that indicates a first dialog theme associated with a first non-player character of a game under development. Step 554 includes receiving, via a user interface, second natural language text that indicates a second dialog theme associated with a second non-player character of a game under development. Step 556 includes generating, via a first generative AI model, dialog data corresponding to a dialog between the first non-player character and the second non-player character. Step 558 includes receiving, via the user interface, an indication that the dialog data is accepted. Step 560 includes generating, via a second generative AI model and based on the dialog data and image data associated with the first non-player character and the second non-player character, cutscene data corresponding to the game under development. Step 562 includes receiving, via the user interface, an indication that the cutscene data is accepted. Step 564 includes generating, via the game development platform, the game under development to include the cutscene data.

Figure 5G:
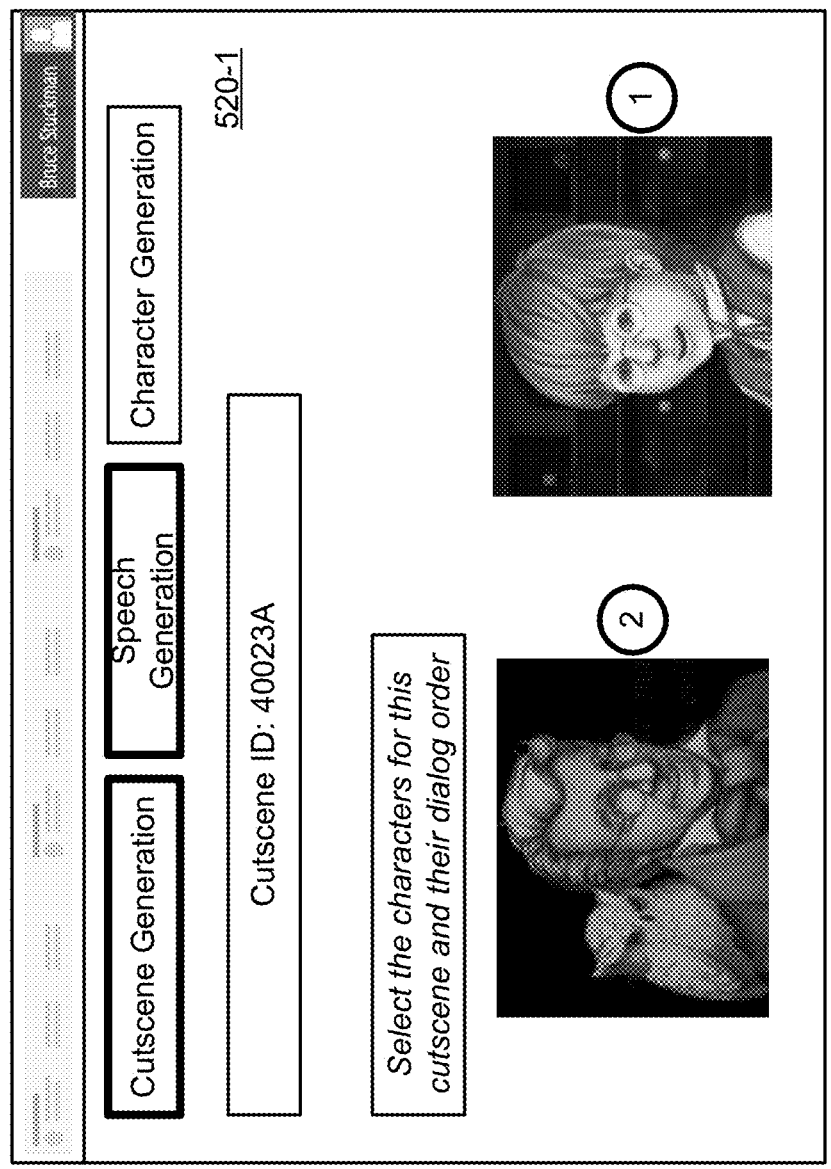
FIGS. 5G-5J present pictorial representations of example screen displays.

FIGS. 5G-5J present pictorial representations of example screen displays. As previously discussed, dialog exchanges between characters can be seeded with natural language text and generative AI, (e.g., chatbot functionality) can be employed to generate dialog whereby each character responds to the prior utterance(s) of the other character. Screen display 520-1 of FIG. 5G shows an interactive user interface that responds to actions of the user to select characters of a game under development to engage in a cutscene dialog and an initial order for this dialog. In the example shown the child NPC will start, followed by the professor NPC.

Figure 5H:
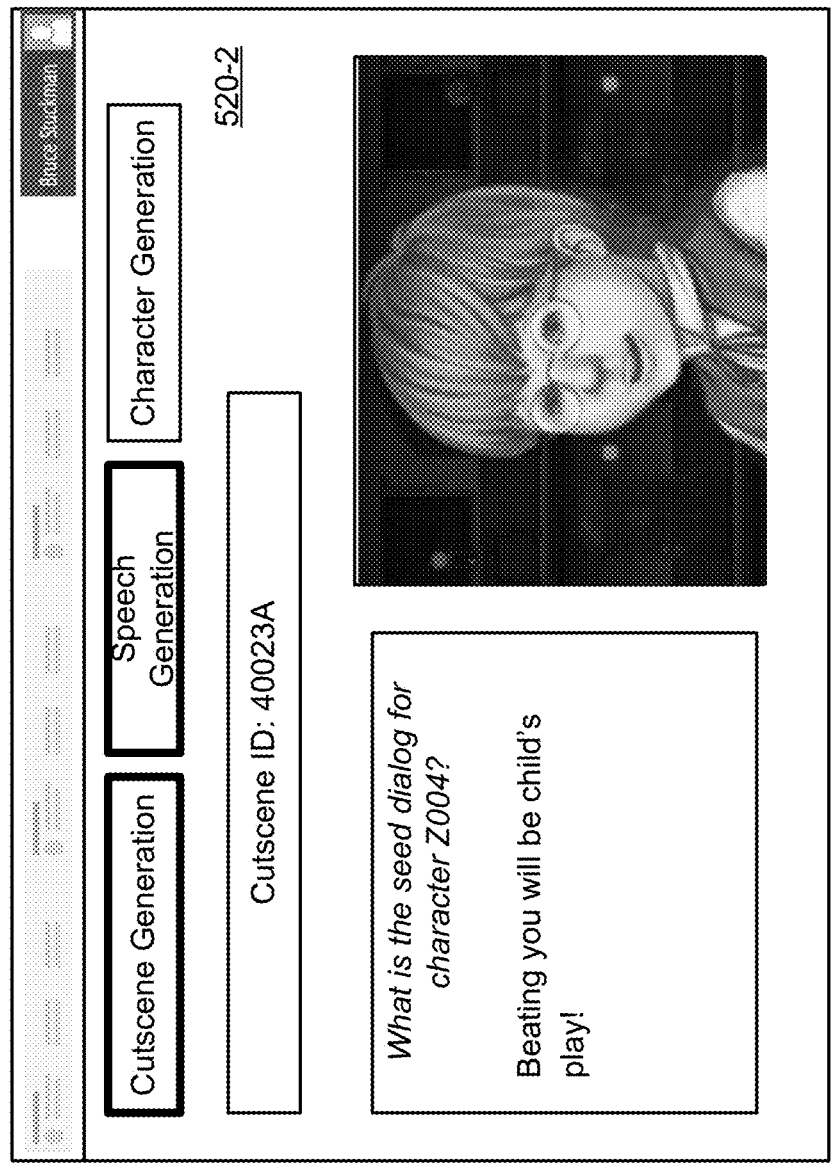
Figure 5I:
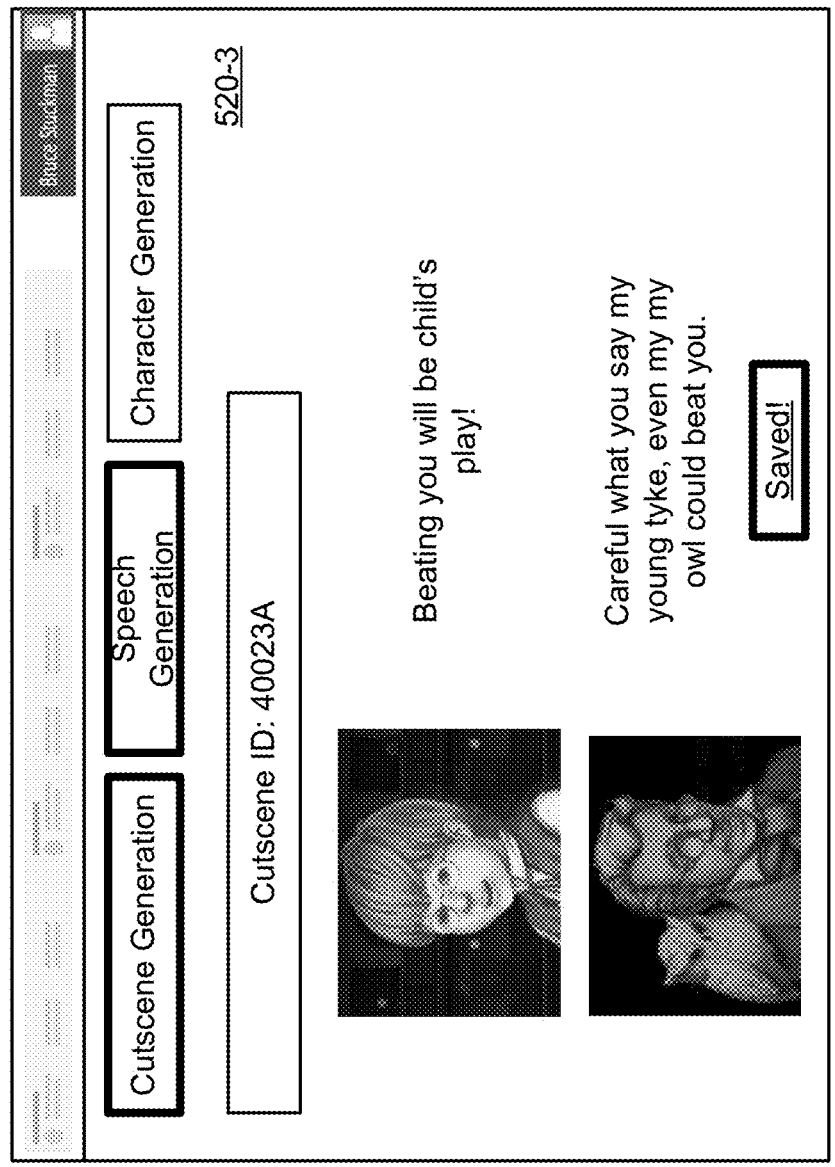
Figure 5J:
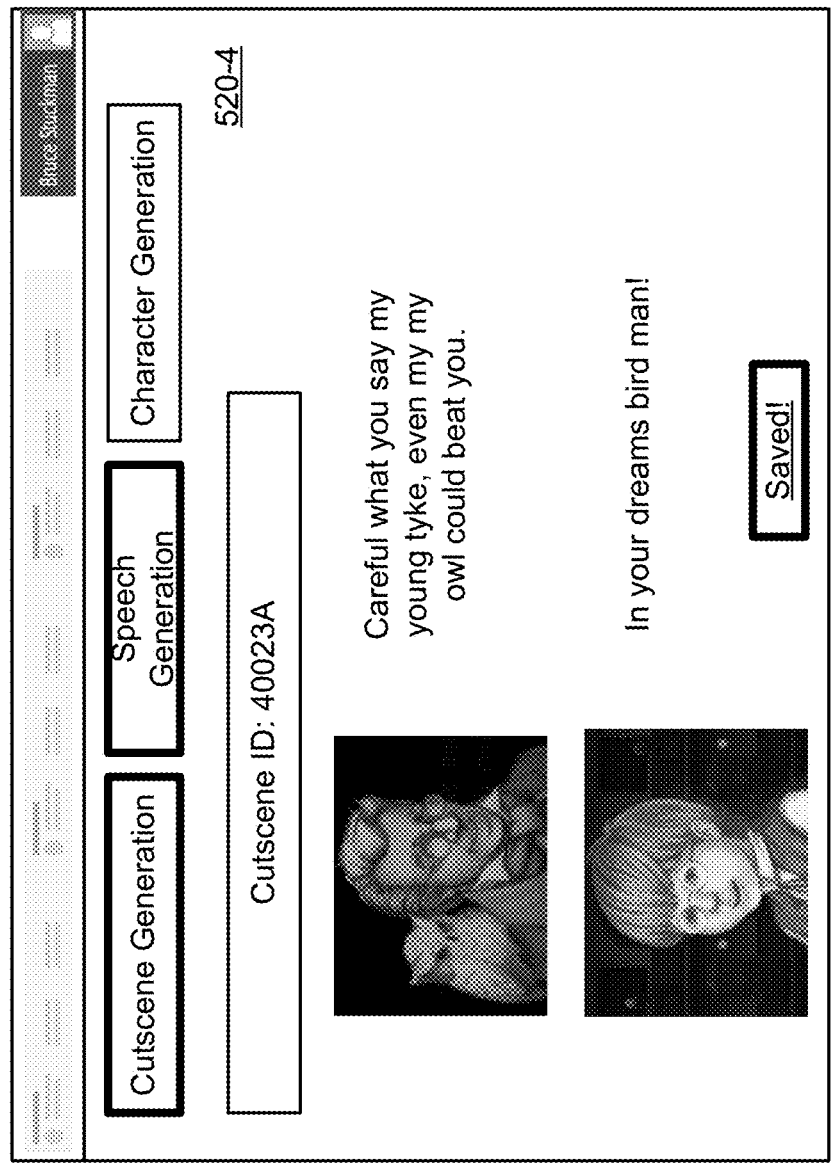

Screen display 520-2 of FIG. 5H shows an interactive user interface that responds to actions of the user to receive natural language text that indicates a dialog seed associated with a first non-player character (the child in this case). Screen display 520-3 of FIG. 5I shows where a first generative AI model (e.g., a chatbot) has generated, responsive to the first natural language text, first dialog response data of a second non-player character (the professor) corresponding to the dialog between the child and the professor. Furthermore, the user interface has received an indication from the user that the first dialog response data is accepted. Screen display 520-4 of FIG. 5J shows where the generative AI model (e.g., a chatbot) has generated, responsive to the first dialog response data, second dialog response data of the first non-player character (the child) corresponding to the dialog between the child and the professor. Furthermore, the user interface has received an indication from the user that the second dialog response data is accepted.

As previously discussed, a second generative AI model can generate, based on the dialog between the first non-player character and the second non-player character, cutscene data corresponding to the game under development. Once accepted by the user via the user interface, this cutscene data can be incorporated into the game under development.

Figure 5K:
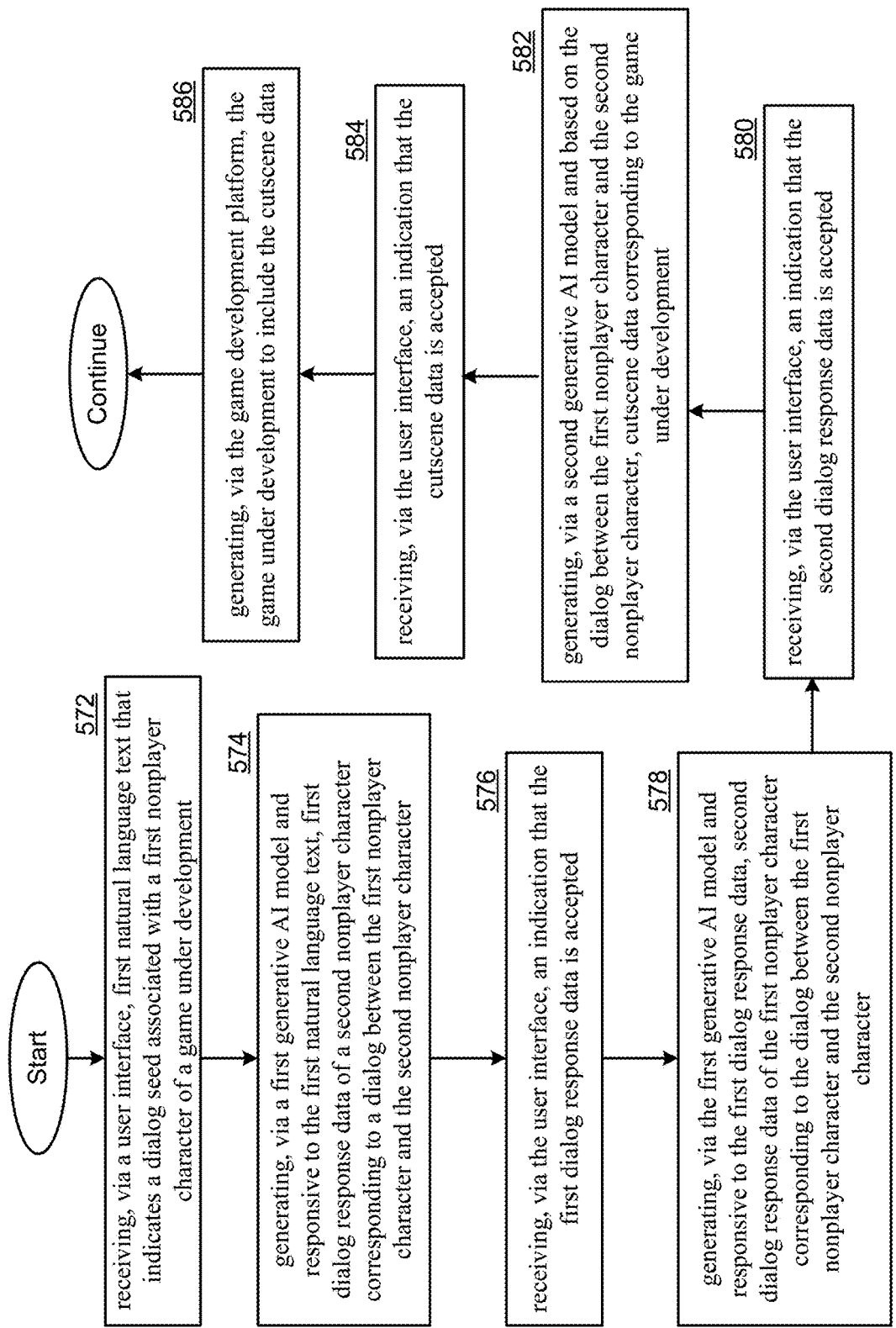
FIG. 5K presents a flowchart representation of an example method.

FIG. 5K presents a flowchart representation of an example method. In particular, a method 570 is presented for use in conjunction with game development platform 105 and/or any of the functions and features described herein. Step 572 includes receiving, via a user interface, first natural language text that indicates a dialog seed associated with a first non-player character of a game under development. Step 574 includes generating, via a first generative AI model and responsive to the first natural language text, first dialog response data of a second non-player character corresponding to a dialog between the first non-player character and the second non-player character. Step 576 includes receiving, via the user interface, an indication that the first dialog response data is accepted. Step 578 includes generating, via the first generative AI model and responsive to the first dialog response data, second dialog response data of the first non-player character corresponding to the dialog between the first non-player character and the second non-player character.

Step 580 includes receiving, via the user interface, an indication that the second dialog response data is accepted. Step 582 includes generating, via a second generative AI model and based on the dialog between the first non-player character and the second non-player character, cutscene data corresponding to the game under development. Step 584 includes receiving, via the user interface, an indication that the cutscene data is accepted. Step 586 includes generating, via the game development platform, the game under development to include the cutscene data.

Figure 6A:
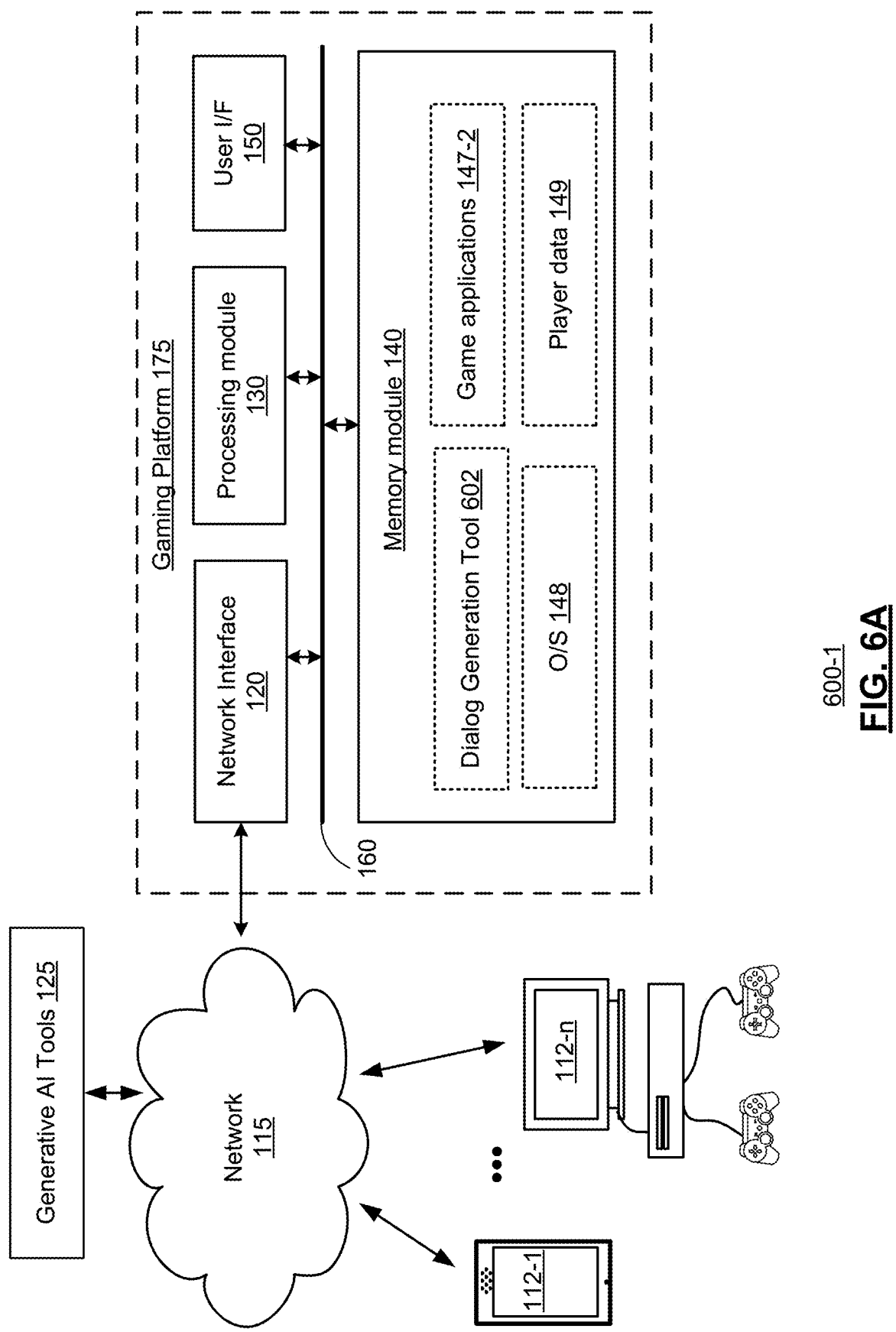
FIGS. 6A-6B present block diagram representations of example systems.
Figure 6B:
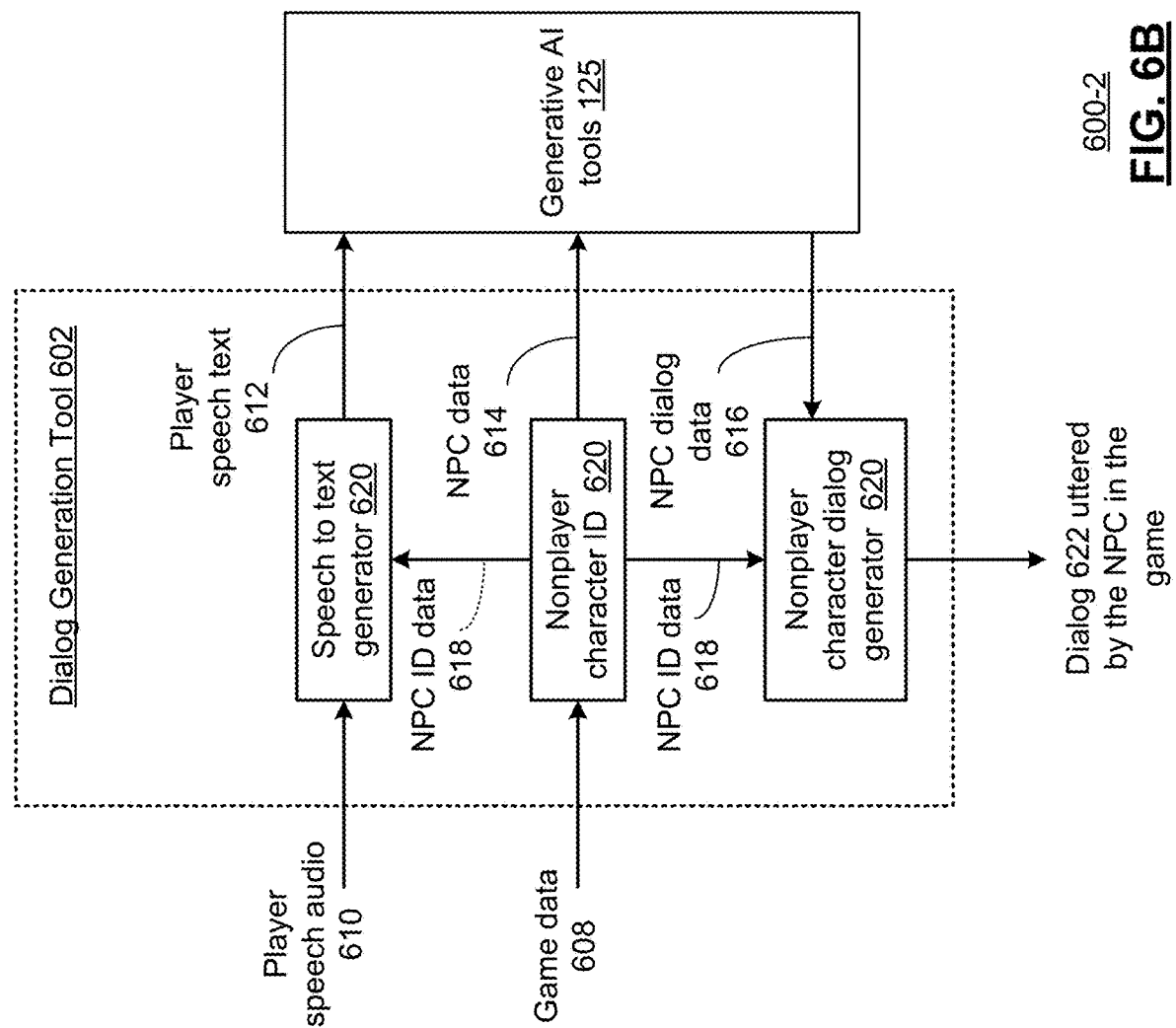

FIGS. 6A-6B present block diagram representations of example systems. In system 600-1 of FIG. 6A, a further example of gaming platform of 175 is shown where similar elements presented in conjunction with FIG. 1B are referred to by common reference numbers. In this example, the gaming platform 175 further includes a dialog generation tool 602 that interacts with at least a portion of the generative AI tools 125 to generate player-interactive game character dialog via generative AI tools 125. In this fashion, the gaming platform 175 facilitates interactive dialog between the player and one or more non-player characters in the game. This improves the technology of online gaming by making these non-player characters more realistic and interactive to the player-enhancing the player experience.

In various examples, the processing module 130 is configured by operational instructions included within one or more elements of memory module 140 to perform the following:
  receiving, via a network interface, player speech audio associated with a player of the game;
  generating player speech text based on a speech-to-text processing of the player speech audio;
  identifying non-player character (NPC) data associated with at least one NPC currently engaging with the player in the game;
  generating, via a generative AI model, NPC dialog data corresponding to a dialog between the at least one NPC and the player; and
  facilitating generation, via the game application and based on the NPC dialog data, the dialog between the at least one NPC and the player.

Turning now to system 600-2 of FIG. 6B, a further example of dialog generation tool 602 is shown. Player speech audio 610 associated with a player of the game is generated by a microphone included in a corresponding client device 112 of the player and transmitted via the network 115 to the gaming platform 175. Speech to text generator 620 generates player speech text 612 based on a speech-to-text processing of the player speech audio 610. Game data 608 processed by non-player character identifier 620 can be used to identify the particular non-player character (NPC) data 614 associated with at least one NPC identified to be currently engaging with the player in the game, for example, based on the NPC(s) in the vicinity of a player's character at that point of the game and/or based on an orientation of the character determined to be facing the NPC in the game world. In various embodiments, the speech to text generator 620 includes speech recognition processing on the generated speech text to recognize when a player has generated words or a phrase that are either directed to a particular non-player character reflected in the NPC data or would otherwise should elicit a response from an NPC(s), and only generates player speech text 612 in these circumstances.

The player speech text 612 and NPC data 614 are transmitted via the network interface to a generative AI model such as a chatbot included in the generative AI tools 125, that responds by generating the NPC dialog data 616 corresponding to a dialog between the identified NPC(s) and the player. The NPC dialog generator 620 facilitates generation, via the game application and based on the NPC dialog data 616, the dialog between the NPC(s) identified by the NPC ID data 618 and the player so that the corresponding dialog 622 is uttered by the particular NPC(s) identified.

Figure 6C:
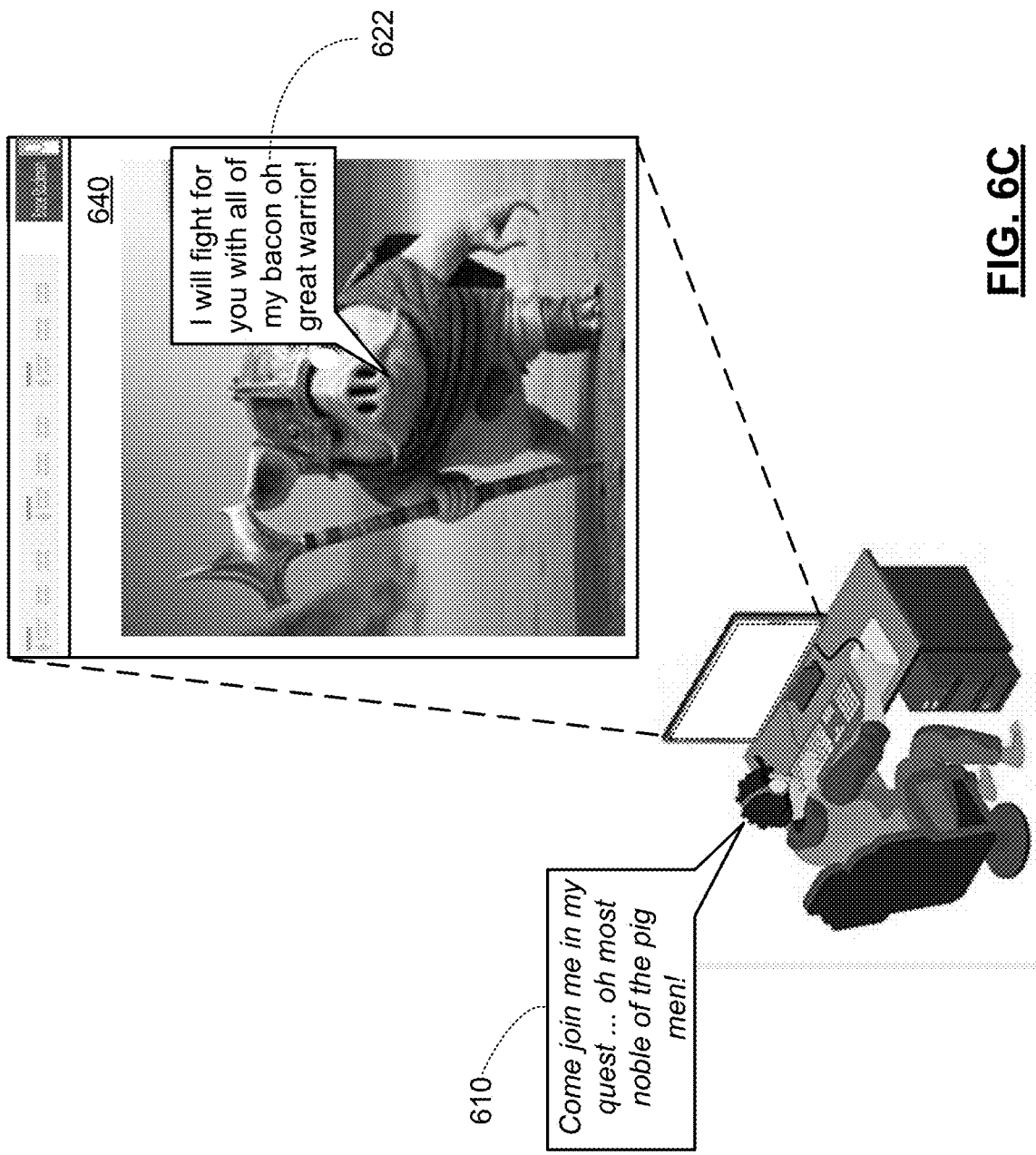
FIG. 6C presents a pictorial representation of example gameplay of an online game.

FIG. 6C presents a pictorial representation of example gameplay of an online game. In the example shown, the player speech audio 610 is identified as corresponding to an NPC in his character's vicinity in the game. The dialog generation tool 602 operates in conjunction with generative AI tools 125 to generate responsive dialog 622 with the player that is uttered, in realtime, via the NPC in the game.

Figure 6D:
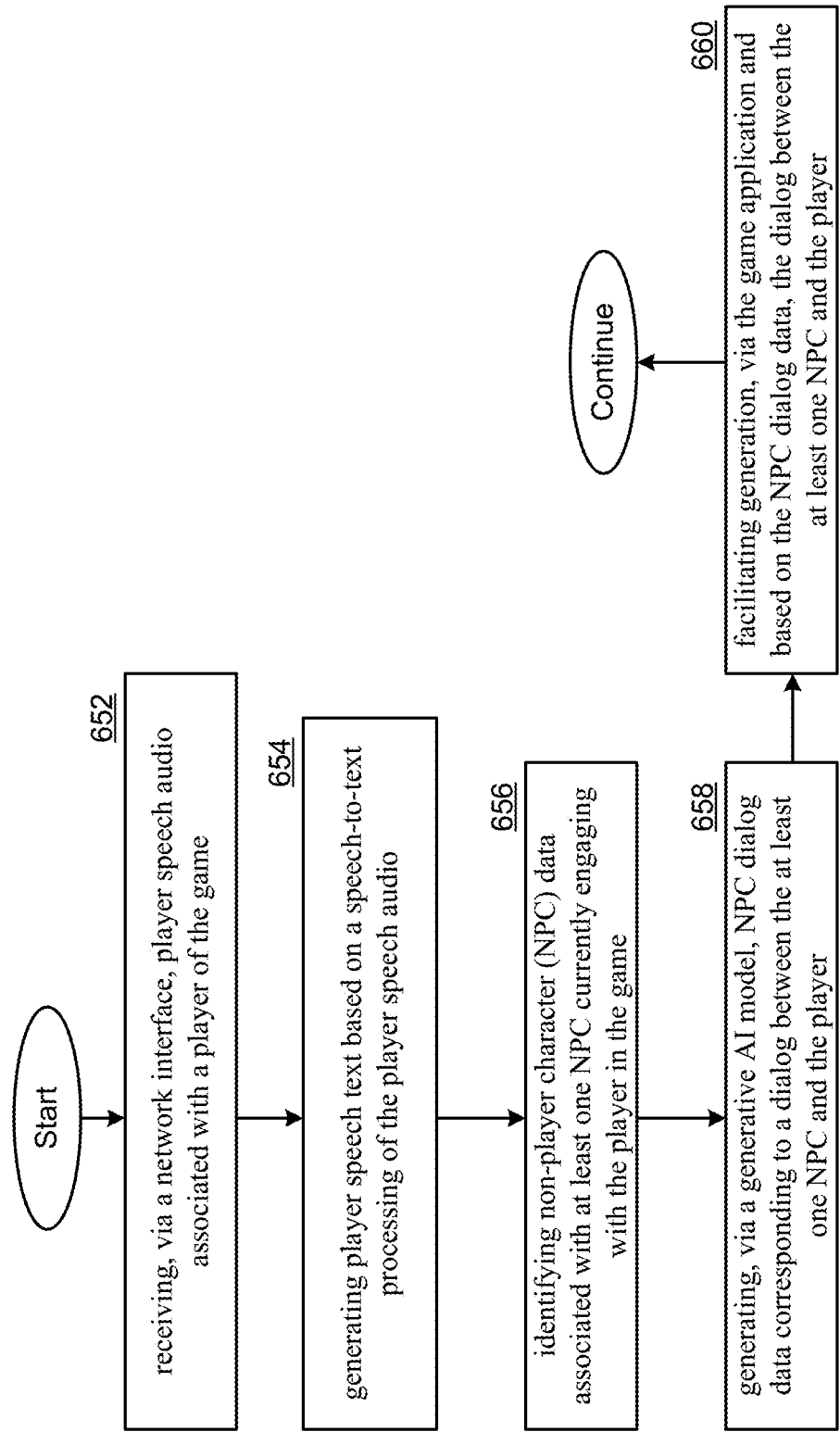
FIG. 6D presents a flowchart representation of an example method.

FIG. 6D presents a flowchart representation of an example method. In particular, a method 650 is presented for use in conjunction with gaming platform 175 and/or any of the functions and features described herein. Step 652 includes receiving, via a network interface, player speech audio associated with a player of the game. Step 654 includes generating player speech text based on a speech-to-text processing of the player speech audio. Step 656 includes identifying non-player character (NPC) data associated with at least one NPC currently engaging with the player in the game. Step 658 includes generating, via a generative AI model, NPC dialog data corresponding to a dialog between the at least one NPC and the player. Step 660 includes facilitating generation, via the game application and based on the NPC dialog data, the dialog between the at least one NPC and the player.

As used herein, the terms "game character" can be used interchangeably to refer to a player or non-player game character in a game.

As used herein the term "tool" corresponds to a utility, application and/or other software routine that performs one or more specific functions in conjunction with a processing system.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such a advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining -A matches -B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition-requires "artificial" intelligence—i.e. machine/non-human intelligence.

One or more functions associated with the methods and/or processes described herein involve NFTs that are generated ("minted") and secured via blockchain or other decentralized computer network technology. The distributed nature of these technologies over different nodes, the contemporaneous nature of geographically distinct calculations, coupled with the extreme computational complexity of the required calculations means that these decentralized computer network technologies cannot practically be performed by the human mind.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A method for use with a game development platform, the method comprising:
    receiving, via a user interface, first natural language text that includes a character description to be associated with a character of a game under development;
    generating, based on the first natural language text and via a generative AI model trained on a library of images and natural language descriptions, image data corresponding to the character of the game under development;
    receiving, via the user interface, second natural language text that includes an updated character description to be associated with the character of the game under development;
    generating, via the generative AI model and based on the second natural language text, updated image data corresponding to the character of the game under development;
    receiving, via the user interface, an indication that the updated image data is accepted; and
    generating, via the game development platform, the game under development to include the updated image data corresponding to the character.

2. The method of claim 1, wherein the natural language descriptions correspond to the library of images.

3. The method of claim 1, wherein updated image data is generated further based on the image data.

4. The method of claim 1, wherein the character is a non-player character.

5. The method of claim 4, further comprising:
    receiving, via the user interface, third natural language text that indicates a speech theme;
    generating, via a second generative AI model and based on the third natural language text, speech data corresponding to the non-player character of the game under development;
    receiving, via the user interface, an indication that the speech data is accepted; and
    generating, via the game development platform, the game under development to include the speech data corresponding to the non-player character.

6. The method of claim 5, further comprising:
    generating, via a third generative AI model and based on the image data and the speech data, cutscene data corresponding to the game under development;
    receiving, via the user interface, an indication that the cutscene data is accepted; and
    generating, via the game development platform, the game under development to include the cutscene data.

7. The method of claim 5, further comprising:
    receiving, via the user interface, fourth natural language text that indicates a second dialog theme associated with a second non-player character of the game under development;
    generating, via the second generative AI model, dialog data corresponding to a dialog between the non-player character and the second non-player character;

receiving, via the user interface, an indication that the dialog data is accepted.

8. The method of claim 7, further comprising:

generating, via a third generative AI model and based on the dialog between the non-player character and the second non-player character, cutscene data corresponding to the game under development.

9. The method of claim 8, further comprising:

receiving, via the user interface, an indication that the cutscene data is accepted; and generating, via the game development platform, the game under development to include the cutscene data.

10. The method of claim 5, further comprising:

receiving, via a network interface, player speech audio associated with a player of the game;

generating player speech text based on a speech-to-text processing of the player speech audio;

identifying non-player character (NPC) data associated with at least one NPC currently engaging with the player in the game;

generating, via the second generative AI model, NPC dialog data corresponding to a dialog between the at least one NPC and the player; and facilitating generation, based on the NPC dialog data, the dialog between the at least one NPC and the player.

11. A game development platform comprises:

a network interface configured to communicate via a network;

at least one processor;

a non-transitory machine-readable storage medium that stores operational instructions that, when executed by the at least one processor, cause the at least one processor to perform operations that include:

receiving, via a user interface, first natural language text that includes a character description to be associated with a character of a game under development;

generating, based on the first natural language text and via a generative AI model trained on a library of images and natural language descriptions, image data corresponding to the character of the game under development;

receiving, via the user interface, second natural language text that includes an updated character description to be associated with the character of the game under development;

generating, via the generative AI model and based on the second natural language text, updated image data corresponding to the character of the game under development;

receiving, via the user interface, an indication that the updated image data is accepted; and generating, via the game development platform, the game under development to include the updated image data corresponding to the character.

12. The game development platform of claim 11, wherein the natural language descriptions correspond to the library of images.

13. The game development platform of claim 11, wherein updated image data is generated further based on the image data.

14. The game development platform of claim 11, wherein the character is a non-player character.

15. The game development platform of claim 14, the operations further comprising:

receiving, via the user interface, third natural language text that indicates a speech theme;

generating, via a second generative AI model and based on the third natural language text, speech data corresponding to the non-player character of the game under development;

receiving, via the user interface, an indication that the speech data is accepted; and generating, via the game development platform, the game under development to include the speech data corresponding to the non-player character.

16. The game development platform of claim 15, the operations further comprising:

generating, via a third generative AI model and based on the image data and the speech data, cutscene data corresponding to the game under development;

receiving, via the user interface, an indication that the cutscene data is accepted; and generating, via the game development platform, the game under development to include the cutscene data.

17. The game development platform of claim 15, the operations further comprising:

receiving, via the user interface, fourth natural language text that indicates a second dialog theme associated with a second non-player character of the game under development;

generating, via the second generative AI model, dialog data corresponding to a dialog between the non-player character and the second non-player character;

receiving, via the user interface, an indication that the dialog data is accepted.

18. The game development platform of claim 17, the operations further comprising:

generating, via a third generative AI model and based on the dialog between the non-player character and the second non-player character, cutscene data corresponding to the game under development.

19. The game development platform of claim 18, the operations further comprising:

receiving, via the user interface, an indication that the cutscene data is accepted; and generating, via the game development platform, the game under development to include the cutscene data.

20. The game development platform of claim 15, the operations further comprising:

receiving, via a network interface, player speech audio associated with a player of the game;

generating player speech text based on a speech-to-text processing of the player speech audio;

identifying non-player character (NPC) data associated with at least one NPC currently engaging with the player in the game;

generating, via the second generative AI model, NPC dialog data corresponding to a dialog between the at least one NPC and the player; and facilitating generation, based on the NPC dialog data, the dialog between the at least one NPC and the player.

* * * * *